(12) United States Patent
Patel et al.

(10) Patent No.: US 7,139,476 B2
(45) Date of Patent: Nov. 21, 2006

(54) DISTRIBUTED FIBER SENSOR WITH DETECTION AND SIGNAL PROCESSING USING POLARIZATION STATE MANAGEMENT

(75) Inventors: Jayantilal S. Patel, Newtown, PA (US); Zhizhong Zhuang, Bensalem, PA (US); Yuri Zadorozhny, West Trenton, NJ (US)

(73) Assignee: Optellios, Inc., Langhorne, PA (US)

( * ) Notice: Subject to any disclaimer, the term of this patent is extended or adjusted under 35 U.S.C. 154(b) by 0 days.

(21) Appl. No.: 10/911,326

(22) Filed: Aug. 4, 2004

(65) Prior Publication Data

US 2005/0276611 A1 Dec. 15, 2005

Related U.S. Application Data

(60) Provisional application No. 60/580,005, filed on Jun. 15, 2004, provisional application No. 60/587,484, filed on Jul. 13, 2004.

(51) Int. Cl.
*H04B 10/08* (2006.01)

(52) U.S. Cl. ............................. 398/16; 398/32; 398/33

(58) Field of Classification Search .................... 398/9, 398/12–13, 16, 19, 32–33, 196–197
See application file for complete search history.

(56) References Cited

U.S. PATENT DOCUMENTS

| | | | | |
|---|---|---|---|---|
| 4,897,543 | A | | 1/1990 | Kersey |
| 5,206,923 | A | * | 4/1993 | Karlsson ...................... 385/12 |
| 5,475,298 | A | * | 12/1995 | Rogers ........................ 324/96 |
| 5,694,114 | A | | 12/1997 | Udd |
| 5,886,802 | A | * | 3/1999 | Majima ....................... 398/95 |
| 6,194,707 | B1 | | 2/2001 | Yang |
| 6,211,957 | B1 | | 4/2001 | Erdogan |
| 6,211,962 | B1 | * | 4/2001 | Nolan ......................... 356/450 |
| 6,493,140 | B1 | * | 12/2002 | Li et al. ...................... 359/495 |
| 6,600,586 | B1 | * | 7/2003 | Hall ............................ 398/207 |
| 6,621,947 | B1 | | 9/2003 | Tapanes et al. |
| 6,721,502 | B1 | | 4/2004 | Al-Salameh et al. |
| 6,778,717 | B1 | | 8/2004 | Tapanes et al. |

(Continued)

FOREIGN PATENT DOCUMENTS

GB   1 497 995   1/1978

OTHER PUBLICATIONS

Anthony Dandridge and Alan D. Kersey, "Overview of Mach-Zehnder Sensor Technology and Applications," Fiber Optic and Laser Sensors VI, Proc. SPIE vol. 985, pp. 34-52 (1988).

(Continued)

*Primary Examiner*—Dzung Tran
(74) *Attorney, Agent, or Firm*—Duane Morris LLP

(57) ABSTRACT

Polarization effects are managed to provide differential timing information for localizing disturbances affecting two or more counter-propagating light signals on one or more optical waveguides passing through a detection zone. Activity can be localized to a point for a security perimeter. Events causing optical disturbance can be mapped to points along a straight line, a perimeter or arbitrary pattern or an array. Events cause local changes in optical properties in the optical waveguide, in particular an optical fiber. Short term local changes are distinguishable from phase changes of light travel in the waveguide, by managing the polarization state of input and output beams, combining orthogonal polarization components and other aspects. The changes in the states of polarization of the counter-propagating light signals are determined and the temporal spacing of corresponding changes in polarization state are resolved to pinpoint the location of the event along the optical fiber.

70 Claims, 38 Drawing Sheets

U.S. PATENT DOCUMENTS 6,897,424 B1 5/2005 Suzuki
2004/0047628 A1 3/2004 Passier et al.

OTHER PUBLICATIONS

Bogdan Kizlik, "Fiber Optic Distributed Sensor in Mach-Zehnder Interferometer Configuration," TCSET'2002 Lviv-Slavsko, Ukraine.

Moshe Tur, Yuval S. Boger, and H.J. Shaw, "Polarization-Induced Fading in Fiber-Optic Sensor Arrays," Journal of Lightwave Technology, vol. 13, No. 7, p. 1269-1276, Jul. 1995.

Alan D. Kersey, Michael J. Marrone, and Anthony Dandridge, "Analysis of Input-Polarization-Induced Phase Noise in Interferometric Fiber-Optic Sensors and Its Reduction Using Polarization Scrambling," Journal of Lightwave Tehnology, vol. 8, No. 6, Jun. 1990.

David W. Stowe, Douglas R. Moore and Richard G. Priest, "Polarization Fading in Fiber Interferometric Sensors," IEEE Journal of Quantum Electronics, vol. QE-18, No. 10, Oct. 1982.

A.D. Kersey, M.J. Marrone, A. Dandridge, and A.B. Tveten, Optimization and Stabilization of Visibility in Interferometric Fiber-Optic Sensors Using Input-Polarization Control, Journal of Lightwave Technology, Oct. 1988, pp. 1599-1609, vol. 6, No. 10.

* cited by examiner

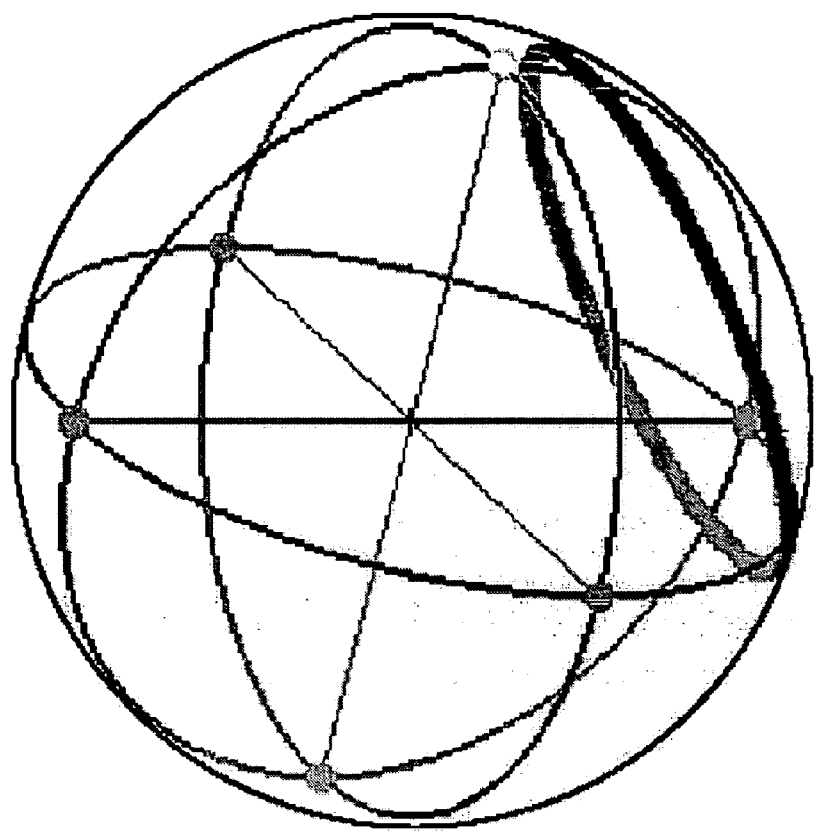
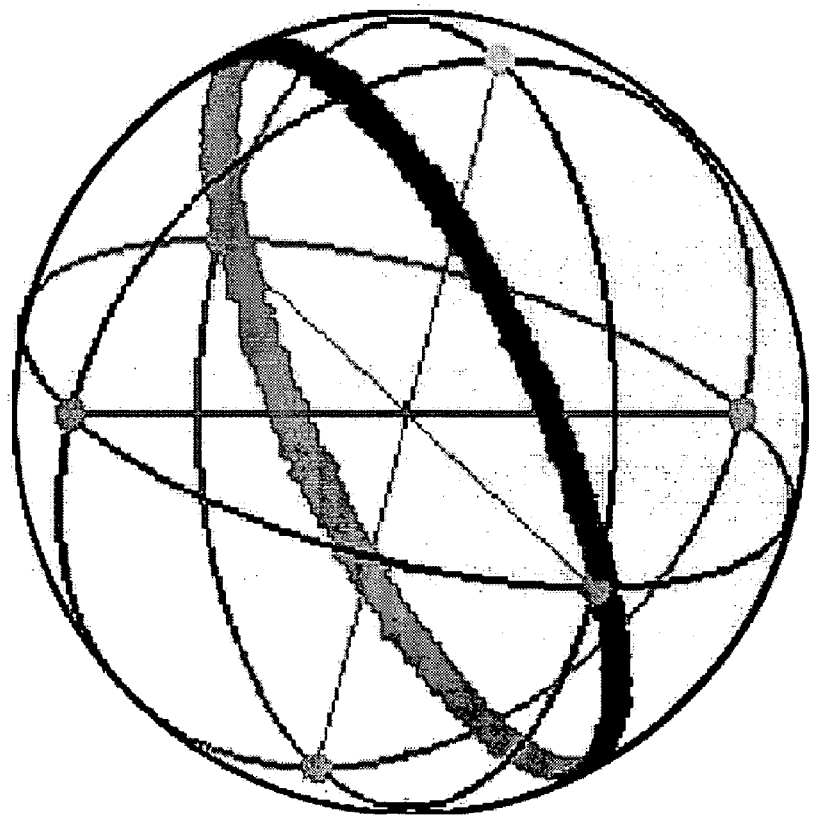
FIG 9

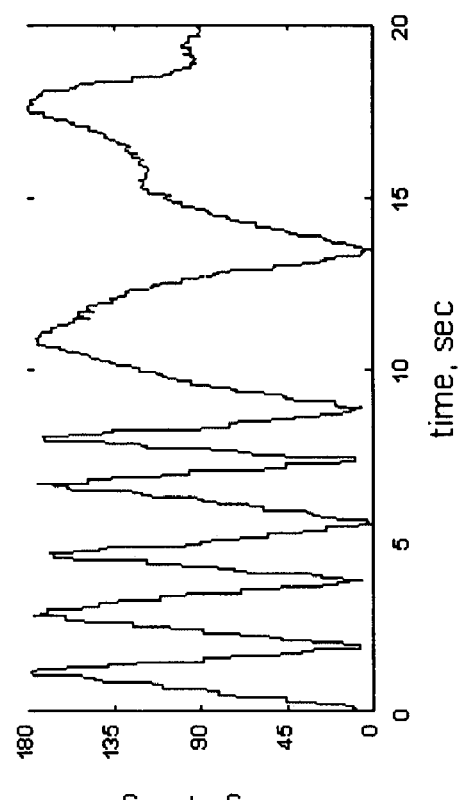
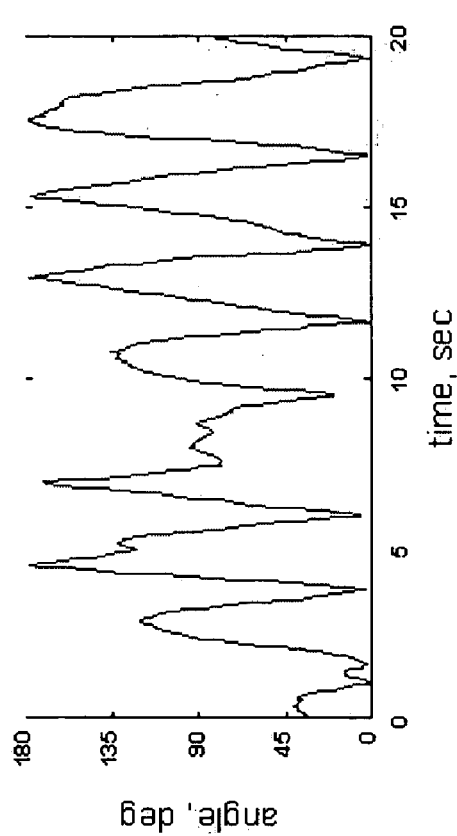
FIG 10 example of two-beam
polarization sensitive combiner example of multiple beam polarization sensitive combiner

DISTRIBUTED FIBER SENSOR WITH DETECTION AND SIGNAL PROCESSING USING POLARIZATION STATE MANAGEMENT

CROSS REFERENCE TO RELATED APPLICATIONS

This application claims the priority of U.S. Provisional Patent Applications Ser. No. 60/580,005, filed Jun. 15, 2004; and Ser. No. 60/587,484, filed Jul. 13, 2004.

BACKGROUND OF THE INVENTION

1. Field of the Invention

The invention concerns a detection and location apparatus and method. Polarization effects are managed and used as the parameter that permits detection of an event that produces a local disturbance in optical characteristics, and determination of the location of the disturbance, to a point along the length of an optical waveguide that forms a distributed sensor.

In one embodiment, a polarization change is developed by establishing two counter-propagating light signals carried by at least one waveguide. The counter-propagating light signals are locally affected by the substantially same disturbance. The effect of the disturbance on the counter-propagating light signals is detected, with a temporal shift, after the light signals have propagated in opposite directions to a detector. The temporal shift is used to calculate the location at which the disturbance affected the light signals.

The waveguide can be an optical fiber or two or more optical fibers or plural modes in a given fiber, in each case supporting propagation of a beam in the waveguide. The opposite light signals can originate from different light sources and/or can be subdivided beams from a same source. Although propagating in opposite directions, the two light signals are affected by the disturbance in substantially the same way.

Polarization aspects of the at least two counter-propagating light signals are established using polarization sensitive beam splitter/combiner elements coupled to the counter-propagating signal channels. A phase difference between beams for each of the counter-propagating light signals is established. In the detection zone, a localized event can cause a disturbance in optical transmission properties such as the refractive index. The changes that result in the two signals are temporally resolved to determine the location of the disturbance to a point along the waveguide, at least to a tolerance.

Physical disturbances such as pressure or stress from moving masses and other events of potential security interest cause polarization altering changes in both of the counter-propagating optical signals. Such changes are detectable according to the invention with sensitivity and precision. The optical fiber waveguide medium is insensitive to electromagnetic interference, intrinsically safe, stable and reliable. However, at the scale of the wavelength of the light signals, momentary stresses and the like produce variations that are readily detectable as phase variations leading to a change in polarization states.

Although the disclosed technology can be applied to various position sensing situations, this disclosure uses the example of optical fiber based perimeter security as a non-limiting example. Inasmuch as an optical waveguide is easily placed to follow various paths, the same technique can be used to extend a detection path between arbitrary zones, to provide a two or three dimensional detection area, etc.

2. Prior Art

A security system should detect and provide information about any intrusion into a protected area or facility. An advantageous system should discreetly detect even modest physical disturbances, and report the location of the disturbance so as to permit corrective action to ensue promptly. If a security system is not visible or otherwise apparent to an intruder, it is more difficult for the intruder to proceed undetected than if elements of the security system are not concealed. There may be a deterrence benefit, however, in making it known that a facility is equipped with security devices.

Some optical sensors rely on gross effects of an intruder's presence, such as the intruder interrupting a beam that is aimed from a source to a sensor. Other sensors rely on proximity or the like. Whether the effect is gross or subtle, there is a need to know not only that a disturbance has occurred but also to know where the disturbance occurred. With one signal path, it may be possible from changes in the received signal to determine that a disturbance has occurred, but not to know where. One technique for localizing a disturbance is by determining the difference in timing between the appearance of effects of a disturbance, in two signals that are both affected by the disturbance. A relative delay in appearance of the disturbance in a signal propagating on one path versus another path, indicates a longer propagation distance from the disturbance to the detector, where the signal is detected. If there are two or more operative paths, measuring the delay can permit one to calculate an apparent location of the disturbance. This technique is described in British Patent GB 1,497,995—Ramsay, entitled "Fiber Optic Acoustic Monitoring Arrangement."

Optical fiber has inherent advantages, such as low loss, immunity to electromagnetic interference and other characteristics, that are useful in remote sensing. Optical fiber interference sensors as in Ramsay have the additional advantages of geometric versatility (i.e., the fiber can follow almost any desired route), wide dynamic range, and high sensitivity, partly due to the very short wavelength of the electromagnetic radiation (light energy) that is carried in an optical fiber. The measurement of the delay in Ramsay and other similar detectors is the phase difference between light from a given source, received over two different paths, such as counter-propagating paths, of potentially different length. The phase difference is detected at the receiving end of both paths, by causing the light from the two fibers to interfere, i.e., to add constructively or destructively at a summing node. As the signals move in and out of phase, the intensity of the interference sum varies between a maximum and a minimum.

Example of an interference sensor is the Mach-Zehnder interferometer, which has been applied to acoustic sensing, magnetic sensing, temperature sensing, pressure sensing, structure monitoring, etc, including using optical fibers, as described in "Overview of Mach-Zehnder sensor Technology and Applications" by Anthony Dandridge and Alan D. Kersey, Fiber Optic and Laser Sensors VI, Proc. SPIE Vol. 985, pp. 34–52 (1988).

In addition to GB 1,497,995—Ramsay, cited above, the publication "Fiber Optic Distributed Sensor in Mach-Zehnder Interferometer Configuration" by Bogdan Kizlik, TCSET'2002 Lviv-Slavsko, Ukraine proposes location fixing techniques. Recent US Patents and publications including U.S. Pat. No. 6,621,947 and US2003198425 teach the possibility of a perimeter defense system based on the same principle.

These prior art teachings rely on interference techniques to produce a variation in intensity that reflects the parameter that is needed to determine a location from a difference in propagation time over two distinct signal paths. There is a problem, however, when attempting to use optical fiber waveguides and the like for location detection because polarization effects and polarization induced phase delays can defeat the ability of an interferometer to produce a robust and dependable signal.

For light waves to interfere, there must be some correspondence in polarization alignment. Two light waves that are plane polarized and orthogonally aligned cannot interfere. Over plural paths between a light source and two or more detectors, each passing a point of disturbance, the birefringence of different fibers inside an optical path can change the polarization alignment and phase characteristics of the light beams. The birefringence of an optical fiber may be small compared to its refractive index. Nevertheless, an accumulated polarization effect arises, particularly over a long distance, and can be a large effect on a wavelength scale. An interferometer-based system cannot perform consistently, and in some circumstances will not perform at all if polarization effects cause the polarization states of the intended interfering counter-propagating optical signals to vary between alignments in the signals are more or less parallel and orthogonal at different times.

Adverse effects on interfering beams due to polarization state changes in a single light path is known as polarization-induced fading. The problem is described, for example, in "Polarization-Induced Fading in Fiber-Optic Sensor Arrays" (Moshe Tur, Yuval S. Boger, and H. J. Shaw, Journal of Lightwave Technology, Vol. 13, No. 7, p1269, 1995). This publication seeks to enhance the visibility of the interference beam in a single-channel fiber based interferometer, where the light travels along a single direction.

An interferometer produces an intensity response by causing phase varying signals to add or to cancel at different phase positions (i.e., to interfere), and as a result, the effect of polarization fading and polarization induced phase shift can be quite detrimental, leading to system failure if precautions are not taken. Occasional or uncontrollable system failure is unacceptable for a system deployed for security purposes. GB 1,497,995—Ramsay (supra) and other known fiber based perimeter security systems as described, detect variations in intensity from interfering two beams and are subject to fading and phase shift with changes in polarization of beams passed through a fiber interferometer in opposite directions. This limits effectiveness of such systems.

The present invention avoids fading and phase shift problems by establishing conditions that provide a robust response notwithstanding time changing polarization transformation characteristics such as birefringence. According to an advantageous aspect, using changing polarization characteristics as the parameter that is sensed and from which location information is resolved, as opposed to using intensity changes in interfering signals, the invention not only provides a versatile and effective disturbance detection system but also solves the prior art difficulty with polarization fading and polarization induced phase shift. This makes the invention practical and effective in perimeter security systems, as well as distributed sensing for various other purposes.

SUMMARY OF THE INVENTION

It is an object of the present invention, on one level, to provide a fail safe solution to polarization fading and polarization induced phase shift, where two or more light signals are propagated over paths of potentially different lengths, particularly counter-propagating signals, in a location resolving event detection system. Moreover, it has now been discovered that polarization effects themselves can be used to substantial advantage as the parameter that enables remote sensing and localization of a disturbance in optical characteristics caused by a nearby event.

Polarization changes are advantageous as a sensed parameter produced by a disturbance. The phase relationship of disturbance effects found in two or more light beams need not be detected from constructive/destructive amplitude interference. When processed and combined appropriately as provided herein, the effects of the disturbance can be resolved into polarization state changes. Polarization state changes are useful as timing reference inputs. However, the attributes that have confounded interferometers (variations in polarization state) advantageously are made into effective and accurate parameters for measuring the temporal change in the counter propagating light signals and the like.

Therefore, an aspect of the invention is the measurement or similar determination of the polarization states of counter-propagating optical signals, each of which comprises two or more beams, making it possible accurately to measure and determine the locus of a phase disturbance encountered by the signals when propagating along distinct paths through an optical fiber.

The invention is applicable to a high-speed polarimeter embodiment used to measure and quantify polarization changes. However, according to another inventive aspect, a novel sensing scheme is provided using a reduced set of parameters and a novel data processing scheme that can extract the necessary timing information from two beams in two fibers as the respective counter-propagating light signals.

These and other aspects of the invention are met in a method and apparatus that manages and uses polarization effects to provide differential timing information for localizing disturbances affecting two or more counter-propagating light signals coupled through a same detection zone. The technique is useful for sensing movement at distributed points along a security perimeter, or in general to locate the position of occurrences along a path that can be a straight line, a perimeter or pattern or a member of an array. The occurrences produce detectable local changes in physical properties in an optical waveguide, such as an optical fiber. Short term changes are made distinct and distinguishable, by managing the polarization state of input and output beams, by combining different polarization components that are taken into account, and/or by ensuring a changing randomized polarization state of the input beams. The short term shift in polarization states caused by the same disturbance in two or more counter-propagating signals is discerned and resolved as a phase difference, the timing of which is used to calculate the a point along the waveguide, at least within a tolerance, where the disturbance occurred.

For these purposes, at least one light source is configured to carry two or more counter-propagating optical signals, each contains two or more beams, through an optical system including at least one length of optical waveguide forming a detection zone along which the disturbance could occur at any place. A beam separator can develop two or more beams coupled into the two counter-propagating optical signals. A polarization sensitive beam combiner selectively combines polarization components of the beams to ensure that a change in the physical properties due to a disturbance is coupled through to a detector with a robust signal to noise ratio.

The beams are applied to the optical waveguide such that an occurrence in the detection zone acts on both of the two counter-propagating optical signals. The beams for each of these counter-propagating signals are combined in a polarization sensitive way and applied to a detector. The output of the detector is processed to localize the disturbance (typically including a short term change in physical properties) to a point in the detection zone, as a function of the phase difference in the respective appearances of the corresponding change in polarization state at the receiving end of each beam. The disturbance is normally due to a physical event in the vicinity of the disturbance, such as the stress or vibration of a passing person or vehicle, the opening or closing of a portal such as a gate, door or window, a displacement or breakage, an acoustic wave, or any similar event.

There are several variations in configuration possible including tuning of the input signal wavelength, using one or more fibers or fiber transmission modes, splitting the beams from one or more coherent laser source or another light sources. The polarization state of the light on the input side can be adjusted or varied, or orthogonal components of the beams can be combined such that local short term deflection of the physical characteristics due to the occurrence can be detected.

These and other objects will be made apparent by the following discussion of several embodiments and variations, by way of non-limiting example.

BRIEF DESCRIPTION OF THE DRAWINGS

There are shown in the drawings exemplary embodiments to illustrate the invention as presently preferred. The invention is capable of these and other embodiments, and it should be appreciated that the scope of the invention is defined by the claims as opposed to this description of illustrative examples. In the drawings.

FIG. 9 compares the circular trajectories on a Poincaré Sphere of an output state of polarization (SOP) evolution when combining orthogonal polarization components.

FIG. 10 shows a pair of time plots for angular change of output SOP calculated from large (left) and small (right) circular trajectories.

DETAILED DESCRIPTION

Figure 1:
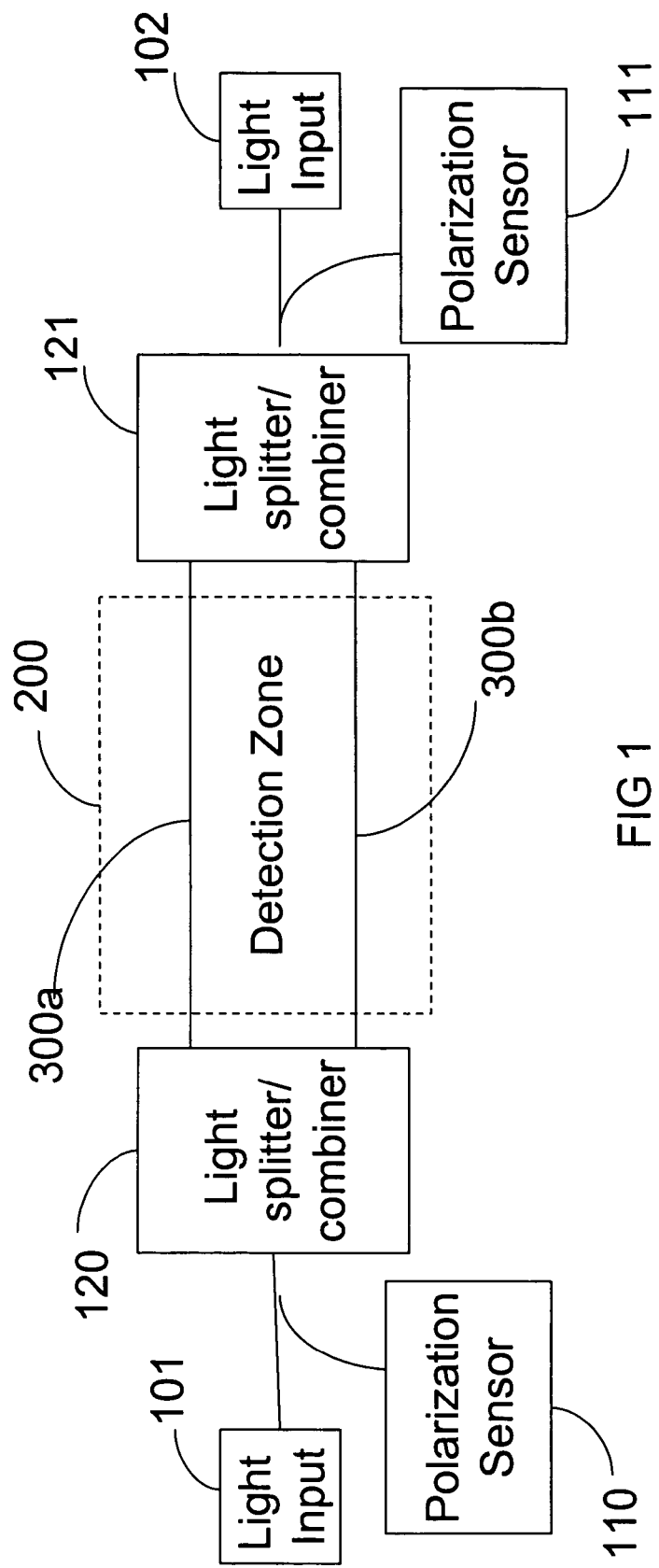
FIG. 1 is a block diagram of the polarization based distributed fiber sensing system.

The invention manages, and moreover uses, variations in polarization aspects of two or more light signals, for discerning the location along an extended waveguide at which location a detectable occurrence has disturbed the light propagation conditions. The disturbance locally affects two counter-propagating optical signals simultaneously, but is detected after the affected light beams have propagated along different paths. The difference in timing at the point of detection is used to calculate backwards and thereby resolve the point along the path at which the disturbance apparently occurred.

The management and use of polarization effects can improve and preferably supplant conventional intensity-based location discerning techniques. Conventional intensity techniques, e.g., as in GB 1,497,995—Ramsay, U.S. Pat. No. 6,621,947—Tapanes, and others, seek to develop and to measure a time difference from optical effects from a physical disturbance, applied simultaneously and at the same point to coextensive beams (especially counter-propagating beams) but are discerned or detected at different times after propagation along different paths. However according to such techniques the operative effect used is a change in intensity at a summing point where two received beams are interfered against one another. The idea is that the disturbance produces a phase delay of one beam relative to the other and that phase shift changes the amplitude of the summed interfering beams that are applied to a detector.

The present inventors have realized that reliance on such interference to obtain a deflection in intensity due to a remote disturbance is confounded by variations in polarization characteristics. Assuming a steady state condition in which two interfering beams produce a given amplitude due to an extent of constructive or destructive interference, only the parallel polarization components of the multiple beams can possibly interfere. Orthogonal polarized beams cannot interfere. This factor complicates the problem, renders the detection/localization technique undependable, and in some situations defeats the possibility of producing an intensity variation by such interference.

The remote disturbance might be any of various physical occurrences that affect the waveguide on a scale comparable to the wavelength of the light, which is normally on the order of hundreds of nanometers. Modest instances of changing physical pressure, motion or vibration and the like can change light propagation conditions sufficiently in an optical fiber or similar waveguide, to produce an effect that might be discerned and used as a basis to localize the effect. However, variations in polarization state can be such that the changing propagation conditions do not neatly couple into parallel polarization components that interfere. The result can be a low amplitude change in the sum of the interfering beams or even no change.

According to an aspect of the present invention, a polarization-based system is provided that manages polarization effects, and preferably uses polarization effects in the counter-propagating optical signals, as opposed to a deflection in their phase relationship, as the operative parameter detected and employed to calculate the location of the disturbance. The inventive system works differently from an intensity-only system, due to this use of polarization states as the operative parameter.

For example, if the states of polarization of two counter-propagating detection beams are parallel, the according to the invention, the state of polarization of the output will be constant. The output will not change even if the phase relationship of these two detection beams should change because detection is based on polarization as opposed to phase delay. For non-parallel states of polarization of the two detection beams, the output state of polarization is related to the phase difference between these two beams. According to an aspect of this invention, this effect is used to discern and to locate a phase disturbing event that occurs at a distance from the detector, and without the difficulty of polarization related fading and polarization-induced phase shift.

The evolution or change in polarization state at the output, resulting from the effects of a disturbance on the detection beams, not only depends on the phase difference between the counter-propagating detection beams. The output SOP also depends on the power distribution among the orthogonal polarization components of the two beams. A change in the phase relationship between the two beams (namely more or less match versus mismatch) is caused dependably to change the output polarization using the technique of combining the two beams using a polarization sensitive combiner.

Referring specifically to FIG. 1, a block diagram shows an inventive polarization based distributed sensing system, wherein the object is to determine the location of a physical event causing a disturbance at some point along an optical fiber waveguide passing through a detection zone 200. Light from one or more light sources 101 and 102, provides an optical signal or channel. The signal from the source 101 or 102 in each case is separated by a beam splitter 120, 121, thereby forming multiple detection beams. Each beam propagates along an optical fiber 300a, 300b. The multiple beams, for each optical channel, pass through the detection zone 200 in opposite directions. The beams are recombined by the polarization sensitive beam combiners 121, 120, respectively, i.e., the beam splitter/combiner working in the opposite direction to join two lines to one instead of separating one line into two. The optical signals from the combined optical channels are detected by polarization sensitive sensors 110,111. The polarization sensors extract at least some information respecting the state of polarization of the combined beams. The polarization sensors are coupled to a data processing unit (not shown in FIG. 1) that determines the time difference between emergence of a corresponding change in state of polarization for the counter-propagating beams, which can then be resolved to some point along the length of the detection zone.

Figure 2:
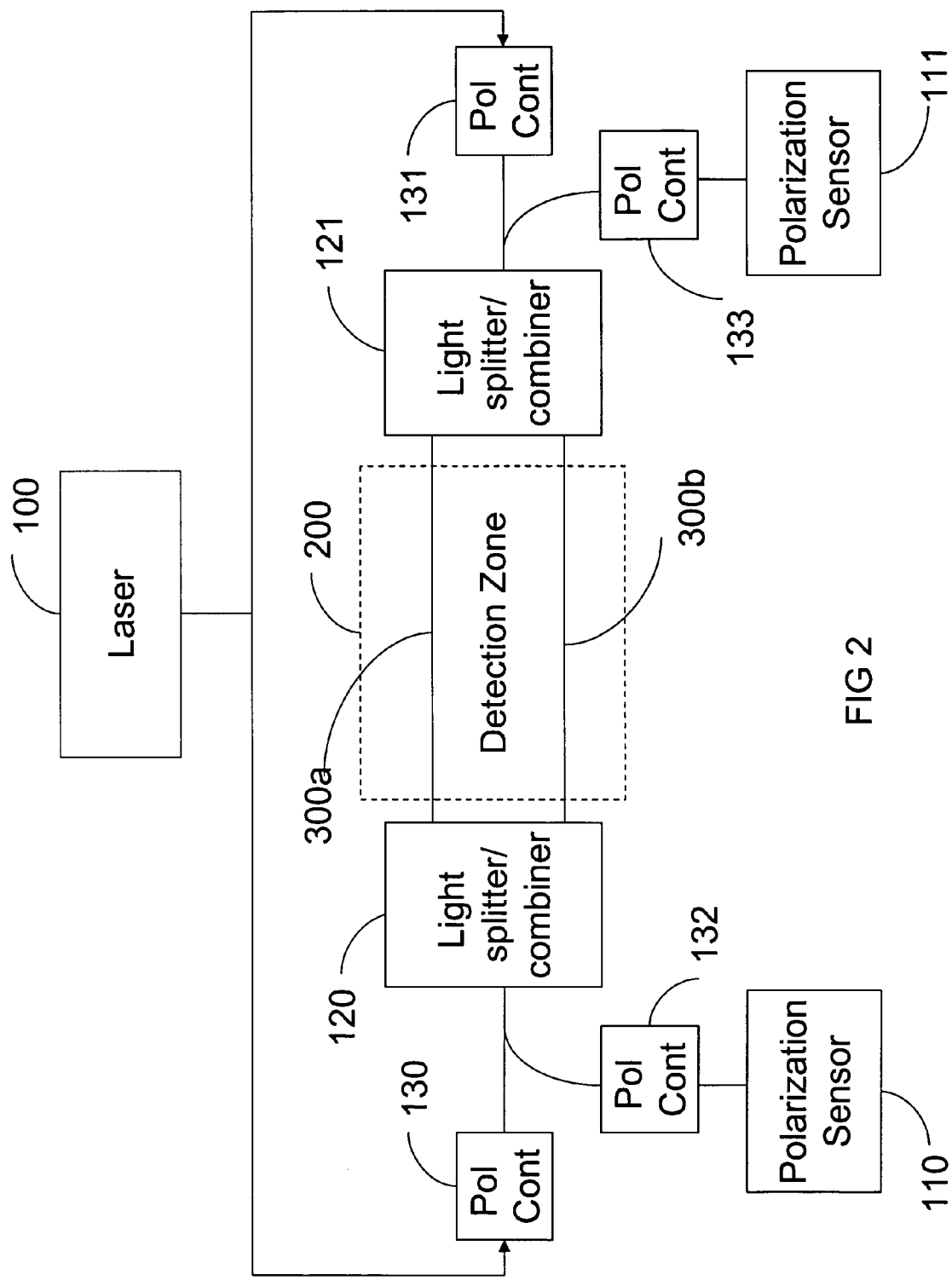
FIG. 2 is a block diagram of another arrangement of the polarization based distributed fiber sensing system.

FIG. 2 is a block diagram showing another arrangement of the polarization based remote fiber distributed sensing system of the invention. In this arrangement, the light for the two optical channels are coming from the same light source 100 instead of the two sources 101, 102 in FIG. 1. Throughout the drawings, the same reference numbers and labels have been used where possible to identify the same or functionally similar elements. Therefore, the description shall rely where possible on the previous descriptions of the same functional blocks instead of describing them anew in each figure or instance. In addition to using one light source, namely a coherent laser light source 100, the embodiment of FIG. 2 also has a plurality of polarization controllers 130, 131, 132, 133, placed so as to advantageously control the optical signals from the laser source 100 into the light splitter/combiners 120, 121 and as emerging from the splitter/combiners 121, 120 (now operating as combiners) into the respective polarization sensors 110, 111.

In the inventive method and apparatus, two detection beams are combined using polarizing beam combiners as elements 120, 121. This manner of combination of the detection beams causes the output state of polarization to always fall at some point on a circle on a Poincaré Sphere. In other words, the state of polarization corresponds to the intersection of a plane and the surface of the Poincaré Sphere. Changes in the detection beams may move the corresponding point on the Poincaré Sphere around the circle but the point remains on the circle. This characteristic will be illustrated further below, including an explanation of how the circle is disposed on the Poincaré Sphere and how it is possible and advantageous to maximize the circle.

If the polarizing beam combiners 120, 121 combine orthogonal polarization components, a relative angular change of the polarization state in the trajectory plane intersecting the surface of the Poincaré Sphere is proportional to the phase difference between the two beams. Therefore, according to an aspect of the invention, the polarization state can be tested and used as the parameter that localizes a disturbance in the detection zone 200 in which the disturbance causes a change in optical propagation properties. Inasmuch as orthogonal polarization components are being combined, there is no potential loss of signal from fading of light energy back and forth between interfering and non-interfering components of summed beams. This detection technique is therefore effective and dependable.

The size of the state of polarization circle on the Poincaré sphere (the intersection or the Sphere and plane) representing the possible trajectory of polarization states, is a function of the relative power of the orthogonal polarization components in the two beams that are being combined. If the intensities of the orthogonal polarization components are equal to each other for both beams, the circular polarization trajectories produced by phase differences will be circles on the Poincaré Sphere of relatively larger diameter, and if these intensities become unequal, the circle shrinks to a relatively smaller diameter in the same way that a latitude around a sphere shrinks in diameter and circumference in advancing from the equator to a pole.

According to one inventive aspect, the changes in polarization state around a circle of polarization states on the Poincaré Sphere represent the parameter by which the location of the disturbance is resolved, and not the variation in intensity produced by interference of the counter-propagating beams. The precision with which the change between polarization states can be resolved (namely the angular displacement between two points on the circle of polarization trajectory) is best when the trajectory circle is large. According to another aspect of the invention as explained below, the precision of the detection measurement can be maintained to an effective precision by taking steps to keep the circle of polarization states large on the Poincaré Sphere. These steps include the effective management of the polarization controllers as well as the wavelength of the laser.

When the orthogonal polarization components are combined from the counter-propagating beams, the angular change in the polarization vector can be equated to a phase difference, and a span of time at the wavelength being used. This provides a measurement of the difference in time for the effects of the disturbance in the detection zone 200 to propagate along the two counter-propagating paths respectively. The time difference permits the location of the disturbance to be resolved to a point in the length of the detection zone. This measurement is independent of confounding influences from orthogonal polarization components and in fact uses those components as the basis for accurate measurements.

By using two sets of polarization measurements for the counter propagating beams, the phase changes between the two beams can be ascertained by measuring the angular change between the polarization vectors for the two counter propagating optical signals. A disturbance in the detection zone is detected when corresponding changes are found in the counter-propagating signals. The disturbance is localized by examining the difference in time between the appearance of such changes at the sensors 110, 111.

With counter-propagating detection beams, the same optical waveguide is interrogated from two different directions (or perhaps coextensive plural optical waveguides are interrogated). Constant or only slowly changing values will be measured for the two counter propagating beams normally. If a short term disturbance occurs somewhere along the length of the optical waveguide in detection zone 200, the time required to propagate to the two detectors or sensors 110, 111 in the counter propagating directions varies with the relative distances over which the respective counter-propagating beams passed between the disturbance and the detector. This time dependence is reflected by an angular change of the polarization alignments for the two counter propagating optical channels, which have been constrained to fall in a circle on the Poincaré Sphere. The difference in propagation time thus can be measured, without polarization induced phase differences or signal fading. Knowing the velocity of light in the optical waveguide, it is a straight-forward calculation from the time difference to state the location of the disturbance along the waveguide in detection zone 200.

According to the inventive polarization-based measurement method and apparatus, the relative differences in states of polarization are of interest, but the particular values of the states of polarization are not relied upon. Therefore, it is not necessary to control the polarizations to a specific state for the system to perform. By comparison, if one sought to detect a phase deflection using an interference intensity method, it might be necessary to establish polarization states for the counter-propagating arms and to keep them essentially the same.

Figure 3:
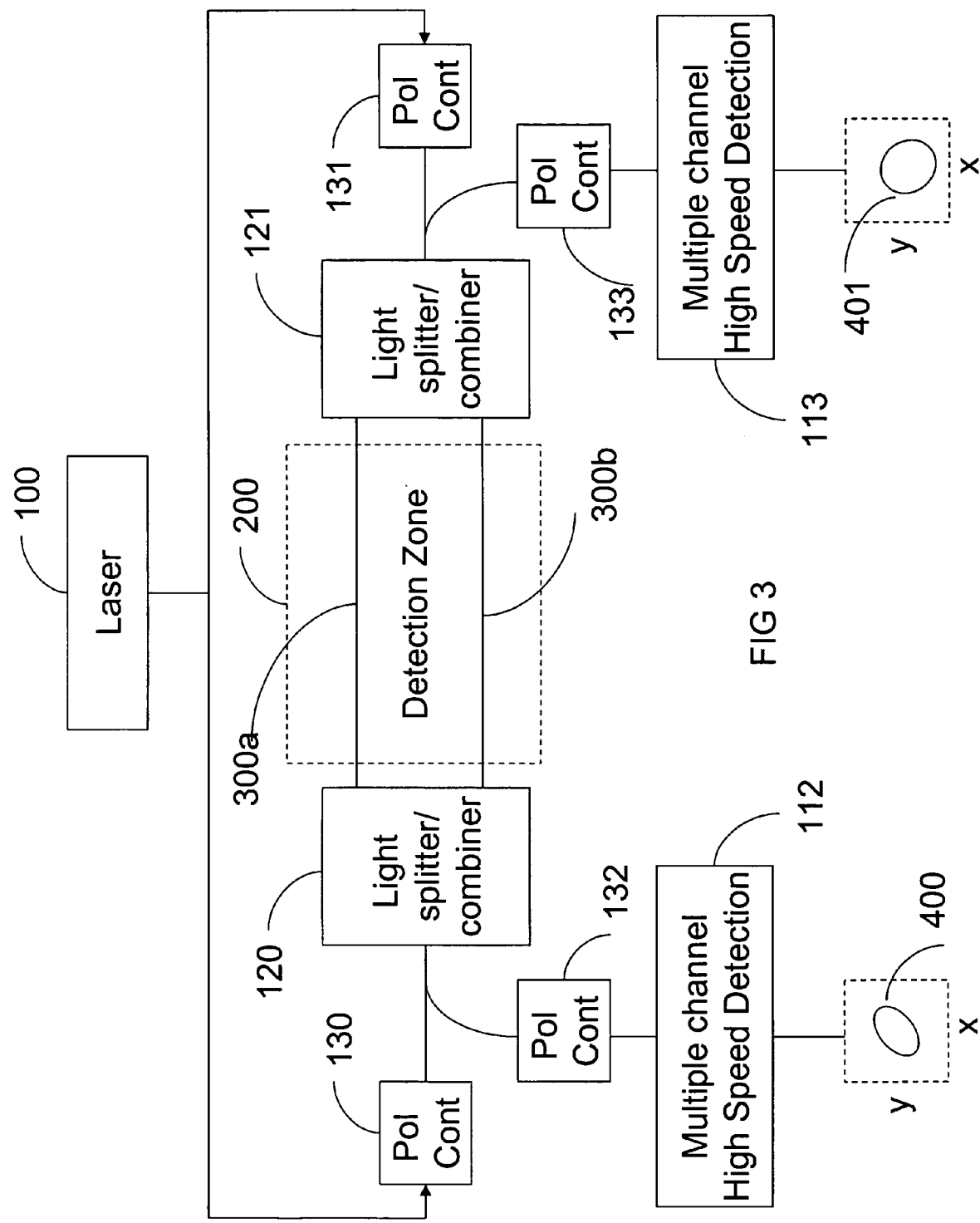
FIG. 3 is a block diagram of another arrangement of the polarization based distributed fiber sensing system.

FIG. 3 is a block diagram, again using the same labels and reference numbers for elements already discussed, demonstrating certain alternative embodiments. Whereas the polarization response of the system can be detected by a polarimeter that is capable of measuring complete polarization properties (e.g., a full set of Stokes variables), a limited polarization sensitive detector is also possible. In FIG. 3, a detection system comprises two multiple channel high-speed detectors as the polarization sensors 112, 113. These detectors each produce a detected response 400, 401, shown graphically, that is sufficient to assess the difference or relative polarization to be determined.

Figure 4:
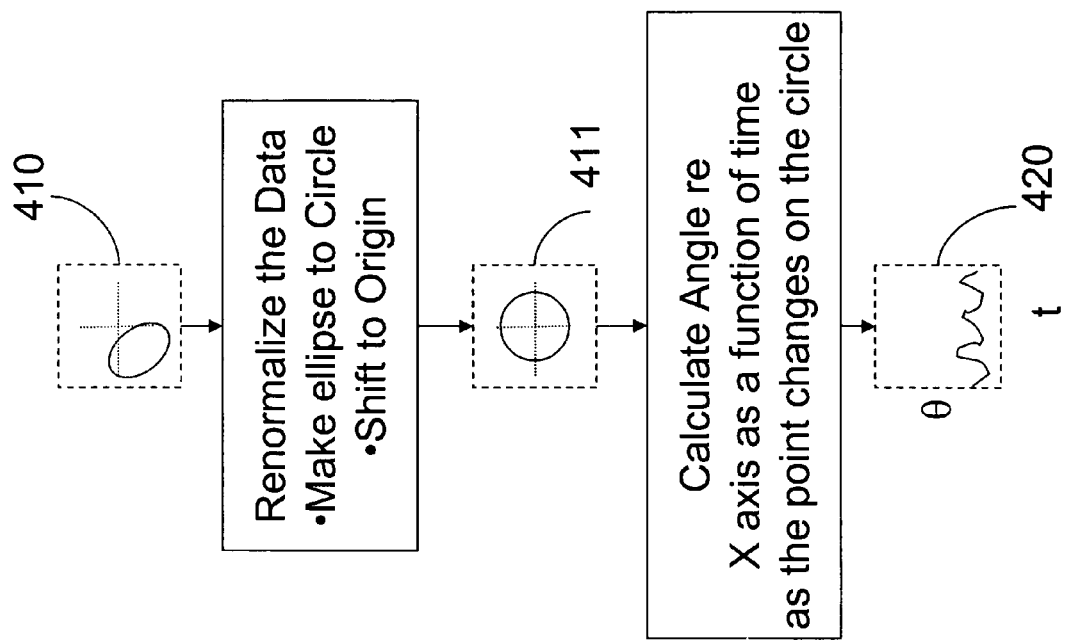
FIG. 4 is a flowchart illustrating phase calculation using polarization information.
Figure 5:
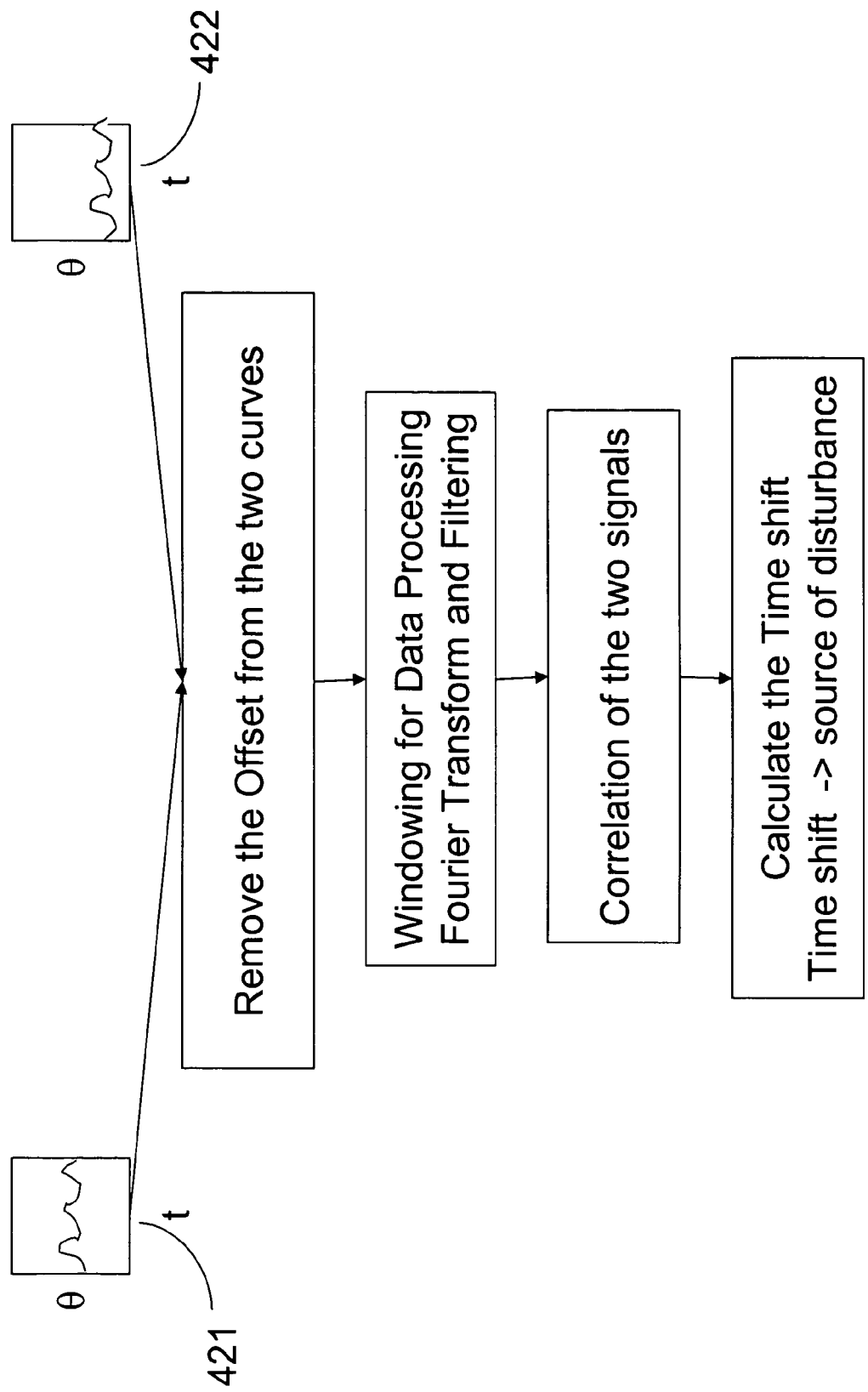
FIG. 5 is a flowchart illustrating location detection based on temporal phase response of counter-propagating optical signals.

FIG. 4 and FIG. 5 are flow charts demonstrating data processing aspects of the invention. The raw signal response 410 is processed and renormalized into a circular trajectory 411, which can be used to calculate a response 420 representing phase versus time. This is done for both detectors 112, 113 and their outputs 400, 401, shown in FIG. 3. The temporal difference between the two resulting phase responses 421, 422 for the counter-propagating optical channels are matched. A time difference between the appearance of corresponding changes is used as the time difference in calculating the location of the disturbance.

In one example, light from the same source is launched into two fibers using a polarization beam splitter. The output light is combined, using a polarization beam combiner so as to analyze the orthogonal components of the light in the two fibers. The combined output light is analyzed using a polarimeter or other polarization sensitive detection scheme. The change of polarization provides the information about the phase difference between the light that travels along the two fibers. This approach does not require a particular state of polarization to be launched into the fiber. Nor is it necessary that the fiber have a particular birefringence. What is needed is a stable launched signal polarization state. It is also helpful if the fiber is relatively stable except for the disturbances that are to be detected. The measurement generally is not influenced by different starting conditions (polarization states and birefringence conditions) or by long term changes that may occur such as changes in temperature. These effects can be ignored and/or distinguished from the short term changes that result from disturbances to be detected. As a result, this dual fiber system can be operated effectively in a bidirectional configuration in conjunction with a high-speed polarimeter or other polarization sensitive detection scheme, as a location sensitive intrusion detection system.

Figure 6:
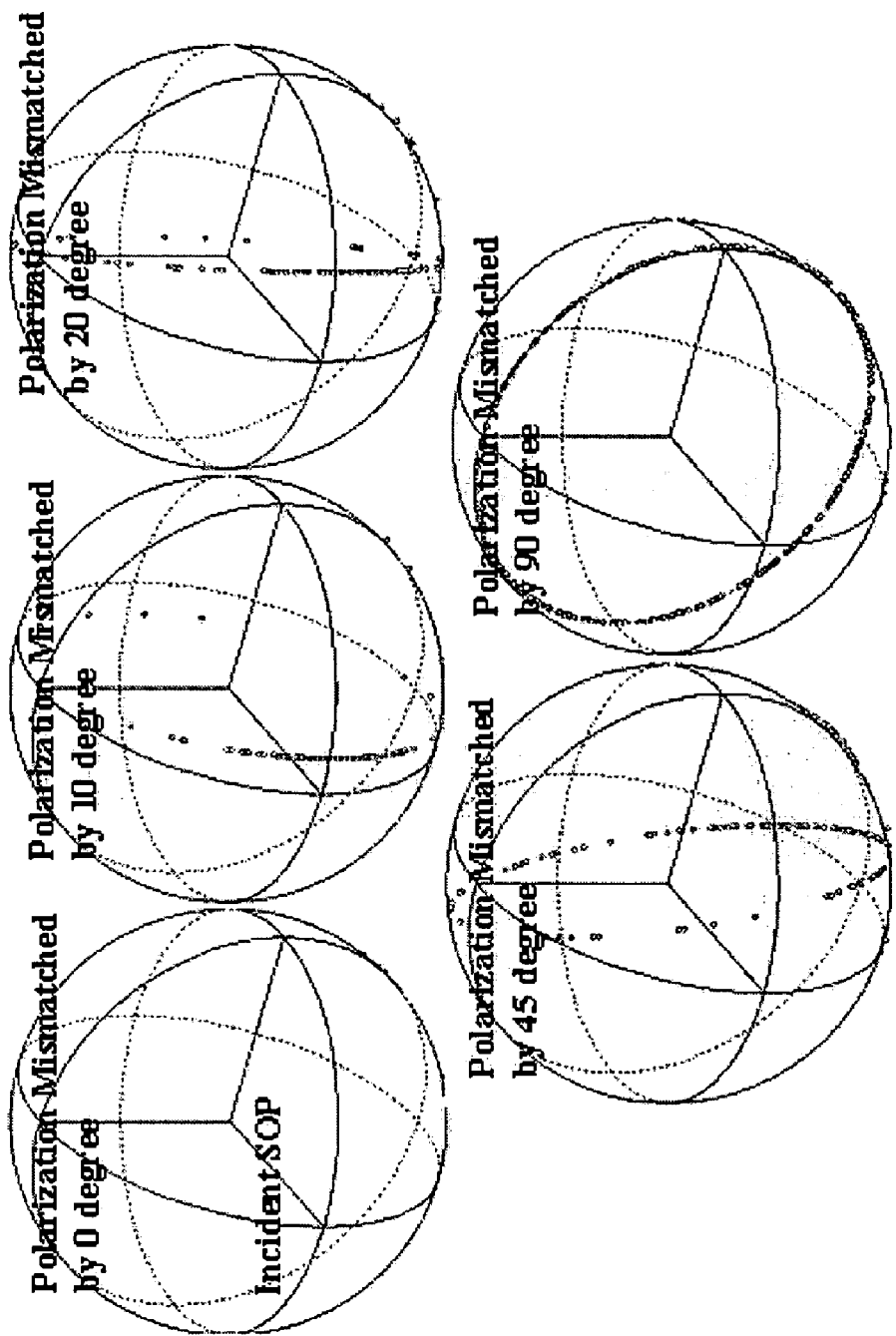
FIG. 6 is a selection of comparable Poincaré Sphere illustrations of polarization trajectories for combining multiple light beams with different states of polarization as identified in the legends.

When light from two beams is combined to obtain an output polarization and the polarization state of the combined beam is shifted, the output SOP trajectory will be on a circle, and the orientation of the circle can vary with the mismatch of polarizations of the combined beams. This is shown graphically on several Poincaré Spheres in FIG. 6. For a combination of equal intensity beams as in FIG. 6, the circle will be a circle of a diameter equal to the diameter of the sphere. For combinations of orthogonal polarization components, a polarization change is proportional to an angular phase difference between the two beams, i.e., a time delay at the corresponding wavelength. For combinations of non-orthogonal polarization components of the beams, the output polarization change is not uniform with the phase difference between the two beams.

According to an aspect of the invention, the beam combination is made polarization insensitive. In that case, the uniformity of the trajectory can be used as an indication and/or measurement of the relative polarization relationship, which as mentioned above is proportional to phase. The polarization induced contribution to phase can be deducted readily.

The phase response can also be detected from the trajectory even for non-orthogonal polarization beam combination; however, the calculation will be easier if the beam combination is polarization sensitive and orthogonal, i.e., accomplished by combining the orthogonal polarization components. Orthogonal beam combination, with a polarization beam combiner has the additional advantage of maintaining constant intensity.

Figure 7:
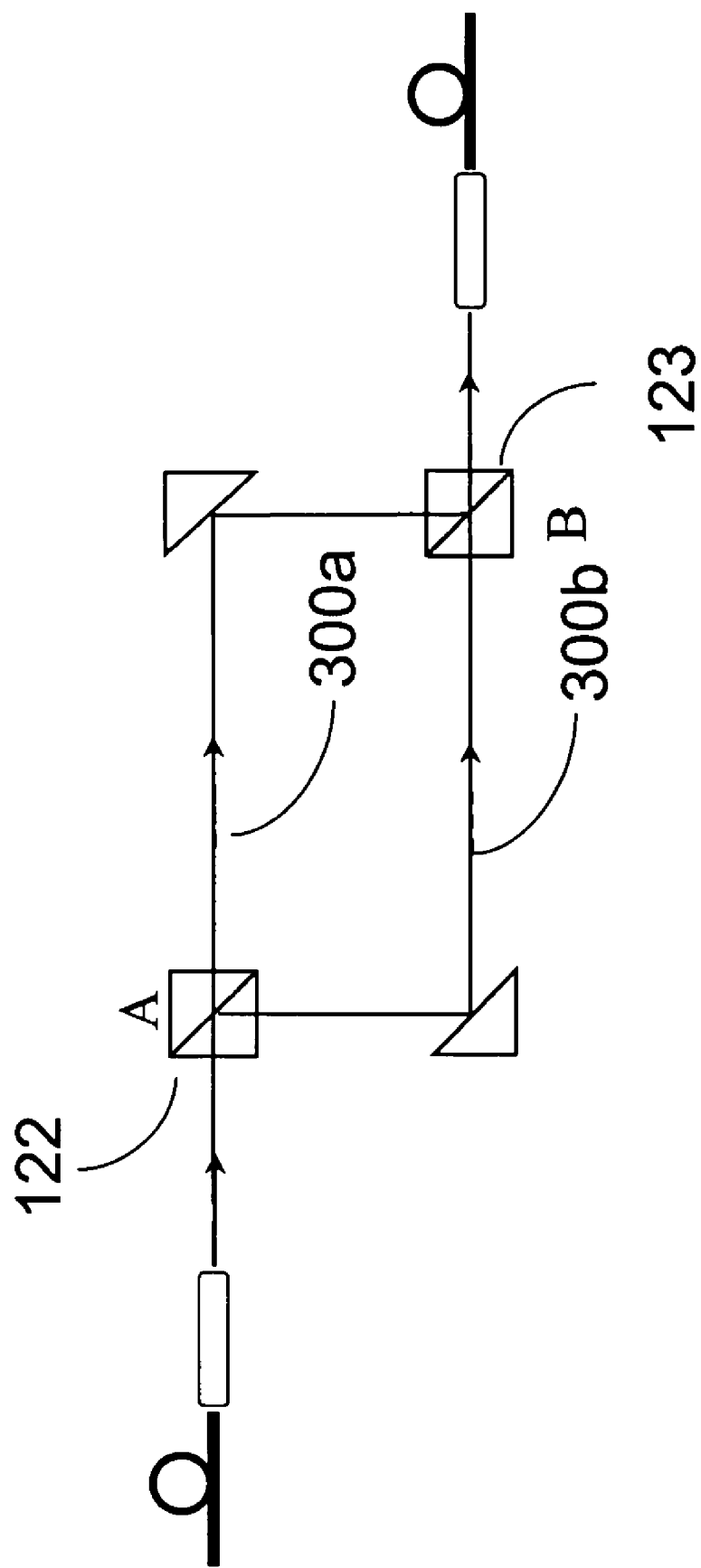
FIG. 7 shows a polarization sensitive beam combination device using a polarizing beam splitter.

A schematic example of phase detection based on polarization change is shown in FIG. 7. Light is injected into two paths 300a and 300b by operation of a beam splitter 122 (element A). In the illustrated example, the beam splitter is a polarization beam splitter. Both beams are recombined using through polarization beam combiner 123 (element B). Because the polarization states are maintained for these two beams, the intensity of the combined beam output from the polarization beam combiner 123 remains constant. The state of polarization (SOP) of the output beam could be varied if a phase difference was introduced, i.e., to relatively delay of one of the two beams. The output power remains substantially constant. The output SOP varies as a function of the phase difference $^{\Delta\phi}$ of the two beams as follows:

$$\vec{E} = E_{10}\hat{x} + E_{20} \cdot e^{\Delta\phi} \hat{y}$$

Figure 8:
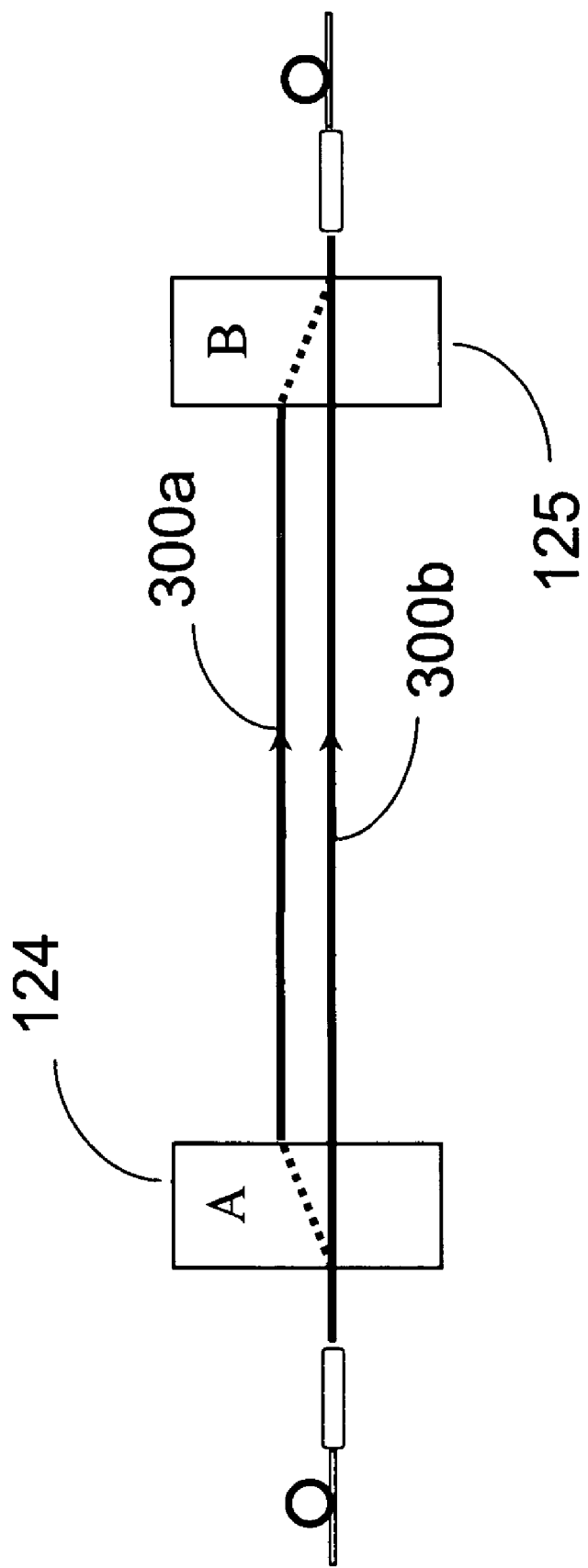
FIG. 8 shows a polarization sensitive beam combination using a polarization beam displacer.

FIG. 8 illustrates another configuration for detection using polarization change. In this embodiment, the polarization beam splitter/combiner is replaced by a polarization displacer, for example comprising a birefringent crystal cut to the required dimension. In general, the structure shown in FIG. 7 and FIG. 8 can be modeled mathematically as a birefringence wave plate that transforms the input state of polarized light into another state of polarized light depending on the extent of birefringence of the crystal material, its thickness and its orientation relative to the input polarization. The output SOP will be rotated about the principle axis by $^{\Delta\phi}$.

In the inventive embodiment, a crucial difference lies in the fact that while the light path through the birefringent crystal may be substantially the same for both polarization beams, for the structures described herein, the paths are physically different so that one polarized light beam may pass through one region of space and the other passes through another region of space, including the possibility of light passing through two different optical fibers. Therefore the relative phase difference $^{\Delta\phi}$ can be measured based on the relative rotation of the SOP.

As discussed above the relative phase difference $^{\Delta\phi}$ is directly related to the polarization change. Considering, the relative phase difference between the two paths in FIG. 7 and FIG. 8, if the intensities of the two polarization components for the two beams that will be combined together are identical, the trajectory of the polarization evolution will be a great circle on the Poincaré Sphere. Uneven power of the two arms will produce a trace a circle on the Poincaré Sphere, but the size of the circular trajectory can vary. The input light can be separated using polarization sensitive or polarization insensitive components. Although the size of the circle depends on the power relation of these two beams, the relative SOP rotation angle is still defined only by the phase mismatch, and does not depend on the power mismatch. FIG. 9 shows the experimental results of the resulting circular SOP trajectories as the phase difference of the two paths change. FIG. 10 shows the calculated angular rotation angle for the output SOP for the large and the small circle. The size of the circle, as indicated before, results from the power imbalance between the two beams. An important point to note is that the variation of the change in the polarization vector as a function of time can be visible and measurable, indicating that relative phase differences between the two paths can be easily determined, even when a power imbalance exists between the two channels.

Figure 11:
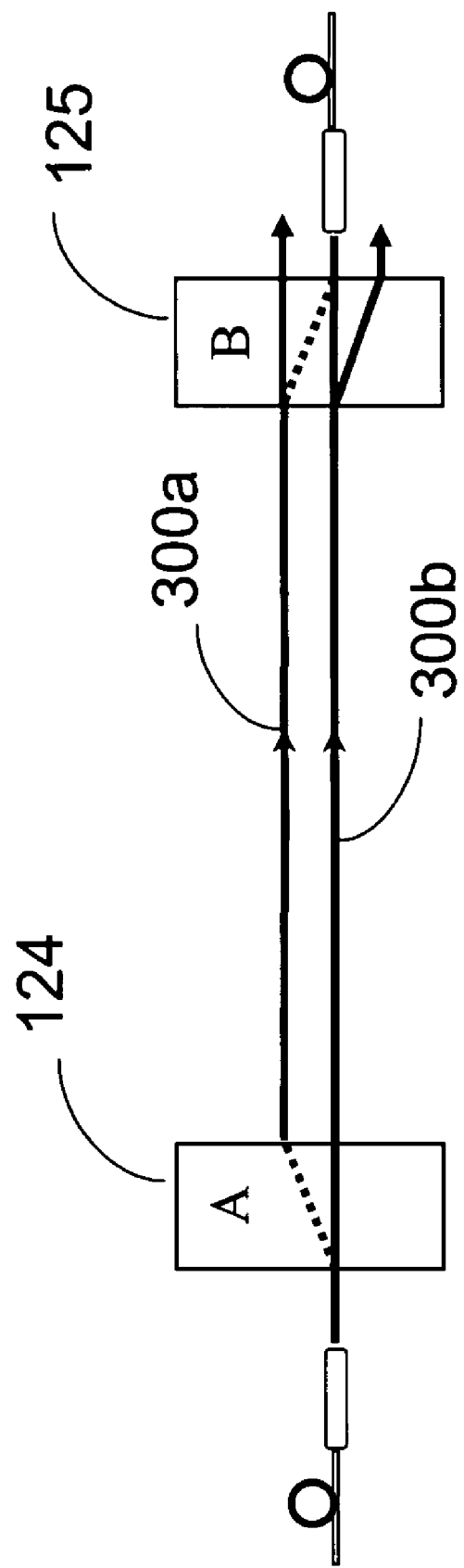
FIG. 11 is a schematic diagram showing a fiber based polarization sensitive beam combination technique.

The above discussion assumes a free space operation, wherein the SOP of the two beams remains substantially unchanged before they are recombined. However the results shown were obtained in an optical system comprising optical fibers. FIG. 11 shows a phase detection configuration with a birefringence in the light path, which is the case when optical fibers are used for the signal paths 300a and 300b. As shown in FIG. 11, after the light has been separated into two beams, the two beams are coupled into two separate single mode fibers. The orthogonal SOP components of the output of these two fibers are recombined at element 125.

Because the fiber exhibits birefringence, the SOP of the light output from each fiber, will normally be different from the input SOP. This difference in SOP will cause some power loss at the polarization combiner 125. However, power fluctuations do not alter the rotation of SOP because the polarization properties in this case are not sensitive to the power level. Such a SOP fluctuation can cause an intensity mismatch, but the phase difference of the two beams can still be measured using relative SOP rotation as the operative parameter, using the techniques described.

Although, in principle, such an intensity fluctuation does not affect the phase measurement due to reliance on polarization properties, there is a practical consideration favoring maintaining intensity. In some special cases, the circular trajectory of the rotation of the SOP can be reduced in diameter on the Poincaré Sphere, even to a single point, which reduces the deflection of the trajectory to the extent that it may be difficult to obtain accurate phase information. When regarding sample points as different points on a trajectory circle, the potential accuracy of the measurement of an angle between the points suffers with decreasing diameter. The two extreme cases wherein the output polarization is such that light from one the beams does not reach the detector are to be avoided if possible. These cases are shown in the two examples in FIG. 12.

Figure 12:
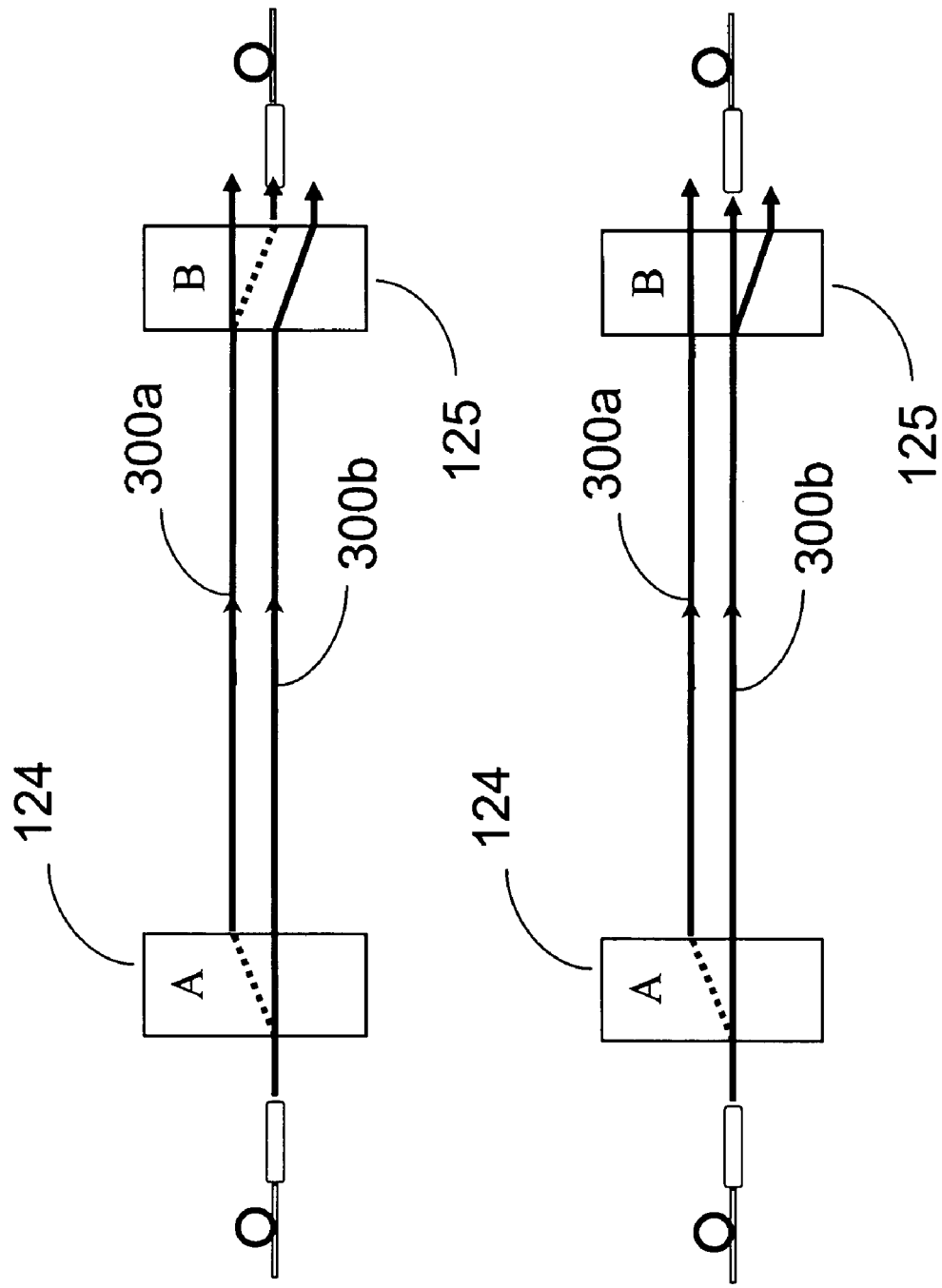
FIG. 12 schematically shows two special situations when only one beam is coupled into the detector.

In FIG. 12, when no light is received along one of the two paths, a phase difference obviously cannot be obtained. There may be some light along both paths, but if the transfer function between the input SOP and one of the two outputs is such that the beams cannot be combined, then a phase difference cannot be obtained and a rotation in SOP cannot be detected. One way to avoid or correct for this situation, if necessary, is by using one or more polarization controllers at some point in the path so that the polarization of one or both of the two beams is altered to avoid the situation discussed above. Another technique is to tune the launch wavelength so as to control the power distribution in the two beams at the polarization combiner. The polarization transformation is wavelength dependent, especially for a long fiber, so changing the wavelength alters the conditions and generally will relieve a special situation.

Figure 13:
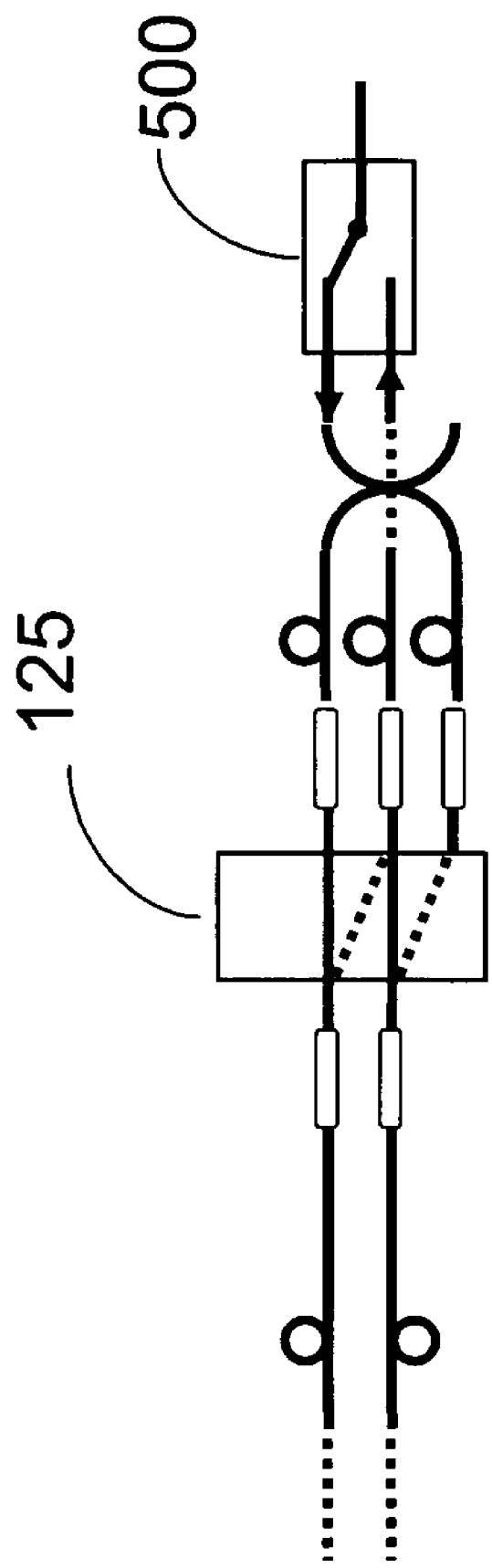
FIG. 13 schematically shows a switching configuration for phase detection using polarization.

Another technique to avoid the problem is to use a switching configuration, for example as shown in FIG. 13, wherein a power mismatch in the two arms can be properly managed by using a 1×2 optical switch 500. In this configuration both the two switch selectable output ports can be used in monitoring the phase difference between the two detection signal paths. At any given time one or the other port can be selected using the switch 500. The decision to switch from monitoring one port to the other can be made by using the size of the circle polarization trajectory circle as a feedback. The data processor toggles switch 500 if the circle diameter in the present measurement is less than some minimum programmed diameter value.

Figure 14:
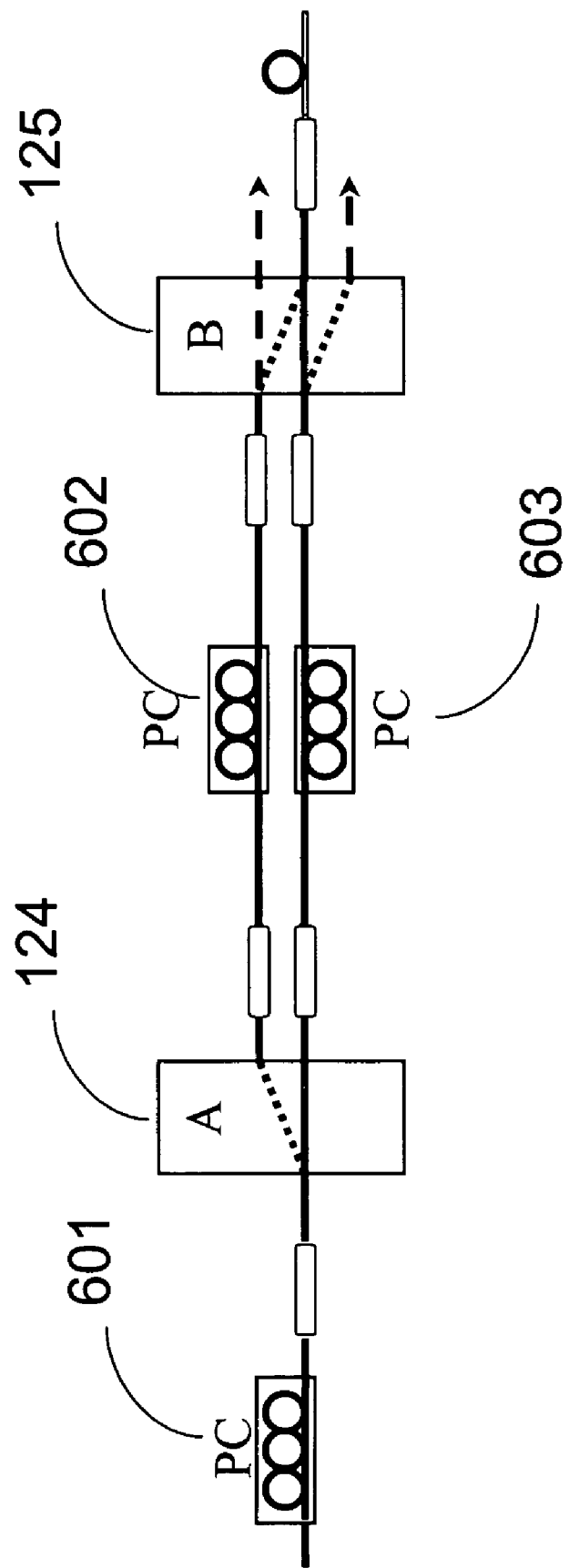
FIG. 14 schematically shows polarization based phase measurement including polarization controllers.

If a polarization controller is used in the system, there are several choices of configuration and operation. As shown in FIG. 14, a polarization controller 601 can precede the polarization splitter 124 to control the incident SOP. A polarization controller 602, 603 can be placed between the polarization splitter 124 and polarization combiner 125. Also the polarization splitter can be replaced by a polarization insensitive coupler, such that there is always equal intensity along the two paths.

The combined output polarization can be detected using a polarimeter that measures a complete set of Stokes parameters. As discussed above, the output polarization will be a circle on the Poincaré Sphere, whose orientation will be determined by the polarization effect of the fiber between the polarization beam combiner and the polarimeter. This effect can be compensated in the polarimeter by reorientation of the Poincaré Sphere. The effects can also be detected by the use of two polarization sensitive detectors, which will be described in more detail below.

Figure 15:
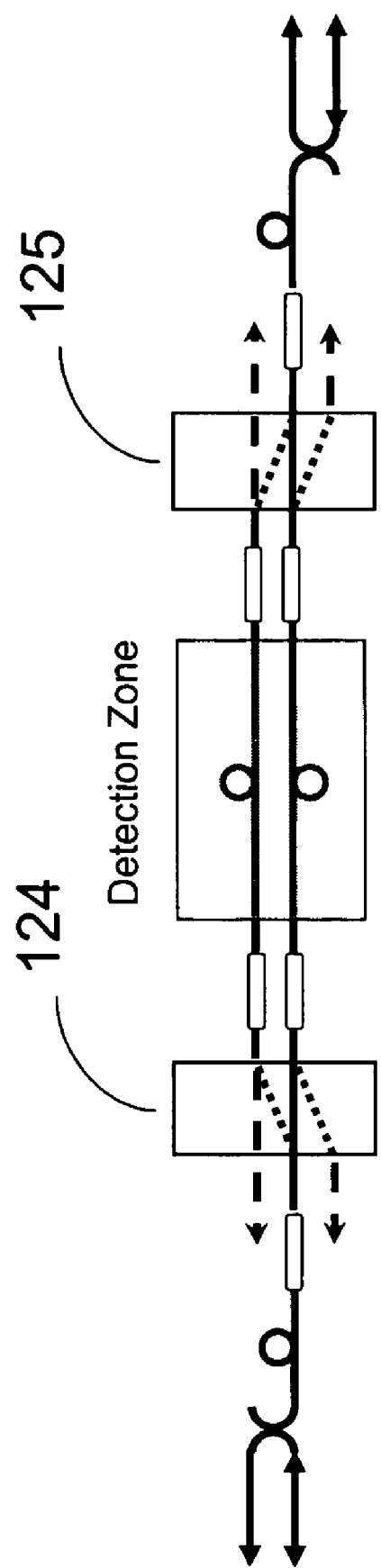
FIG. 15 schematically illustrates a bidirectional polarization based fiber distributed sensor.

By measuring the relative SOP rotation along the two counter propagating directions, the location of an intrusion can be resolved by equating the rotation with a time delay and equating the time delay with a difference in propagation time between the intrusion and the detectors. In a polarization sensitive arrangement as shown in FIG. 15, there is no need to adjust the SOP such that the SOP for the two paths are matched before a point of interference. As a result, the method and apparatus of the invention are more robust and less sensitive to system fluctuations.

Figure 16:
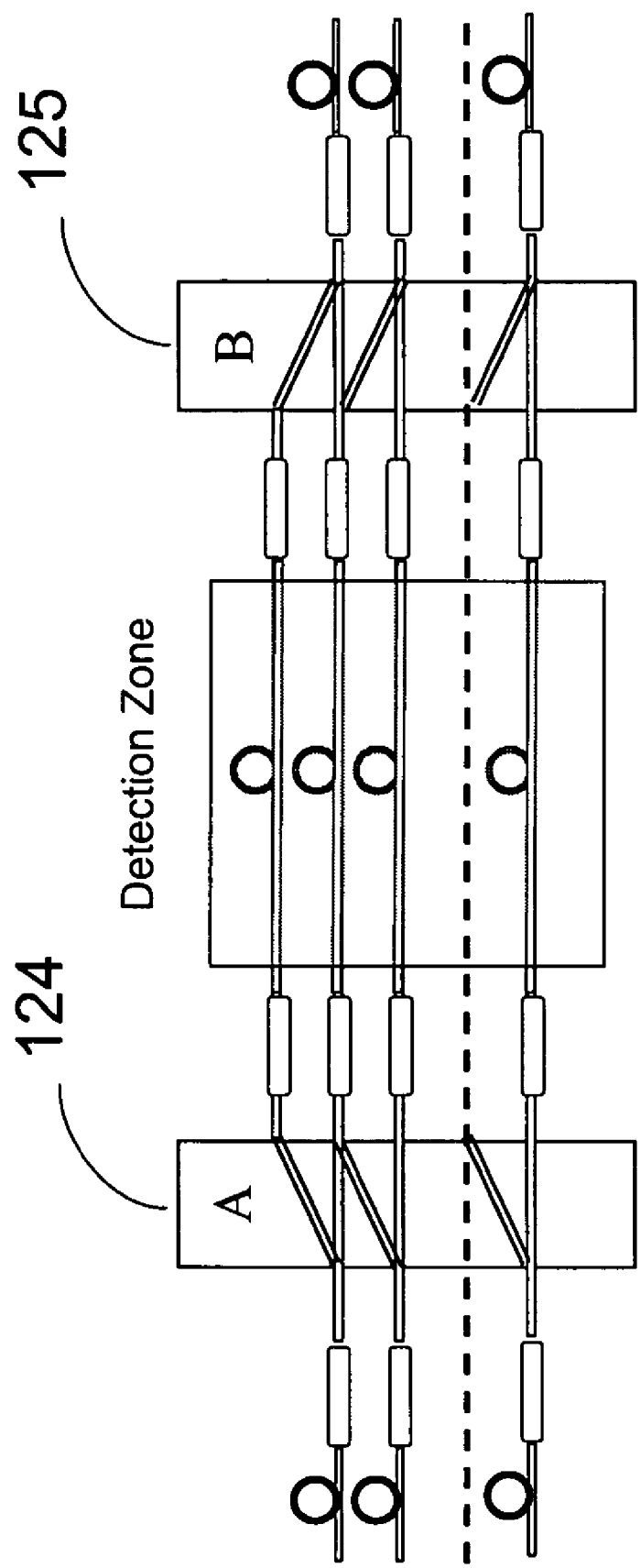
FIG. 16 shows a mesh configuration of plural polarization based fiber distributed sensors in an array encompassing at least two dimensions.

The invention enables the point of a disturbance along a path to be resolved, which is useful in a perimeter defense system to determine when an event occurs that crosses over a line along which the distributed system is placed. The optical fiber might be strung along the perimeter or elongated border around an area of interest to be secured. The invention is quite apt for application to fence and border control and the fiber could be buried along a line, incorporated in a fence or other structure, etc. These applications are only one of various types of applications. There are situations where not only a perimeter line might be sensed, but also other configurations. FIG. 16, for example, shows an array of elongated sensing path forming a grid that might be laid over an area to locate the X-Y position of a disturbance in a grid or area mesh. This configuration can be imagined as a series of disturbance locators, which for a given pair provides a predetermined X (or Y) location in the array and the pair on which the disturbance was detected provides a length displacement in the perpendicular (Y or X) direction.

FIG. 16 illustrates a two-dimensional regular array configuration. In this case each set of two adjacent pairs of detectors shares an optical path and the pairs each have a combined output such that the pairs constitute detection paths arranged in parallel. It is also possible to cover an array as shown using a single path that is distributed throughout the X-Y area.

An area of interest can be divided into several sub-areas of interest, with parallel borders and detection lines or other arrangements. The array can involve several functionally and/or physically parallel measurement lines or a continuous cascaded array of detection zones set out in a sinuous or zigzag arrangement. Neighboring sub-areas can share a border. Sub-areas can be spaced or abutted or overlapped. Although the discussion of arrays suggests some sort of regular array or coverage, an irregular array can also be used with the length of positions along the path mapped in a memory to a meaningful physical location such as a point in an area, or functionally significant location such as a gate or doorway or known path or geologic feature such as a ridge or watercourse, or a political boundary, etc. Having neighboring sensors share a common fiber, effectively decreases the number of fibers and the cost. Having a single distributed sensor can decrease the need for multiple detectors, or multiple sensors can be selected using optical switches.

Figure 17:
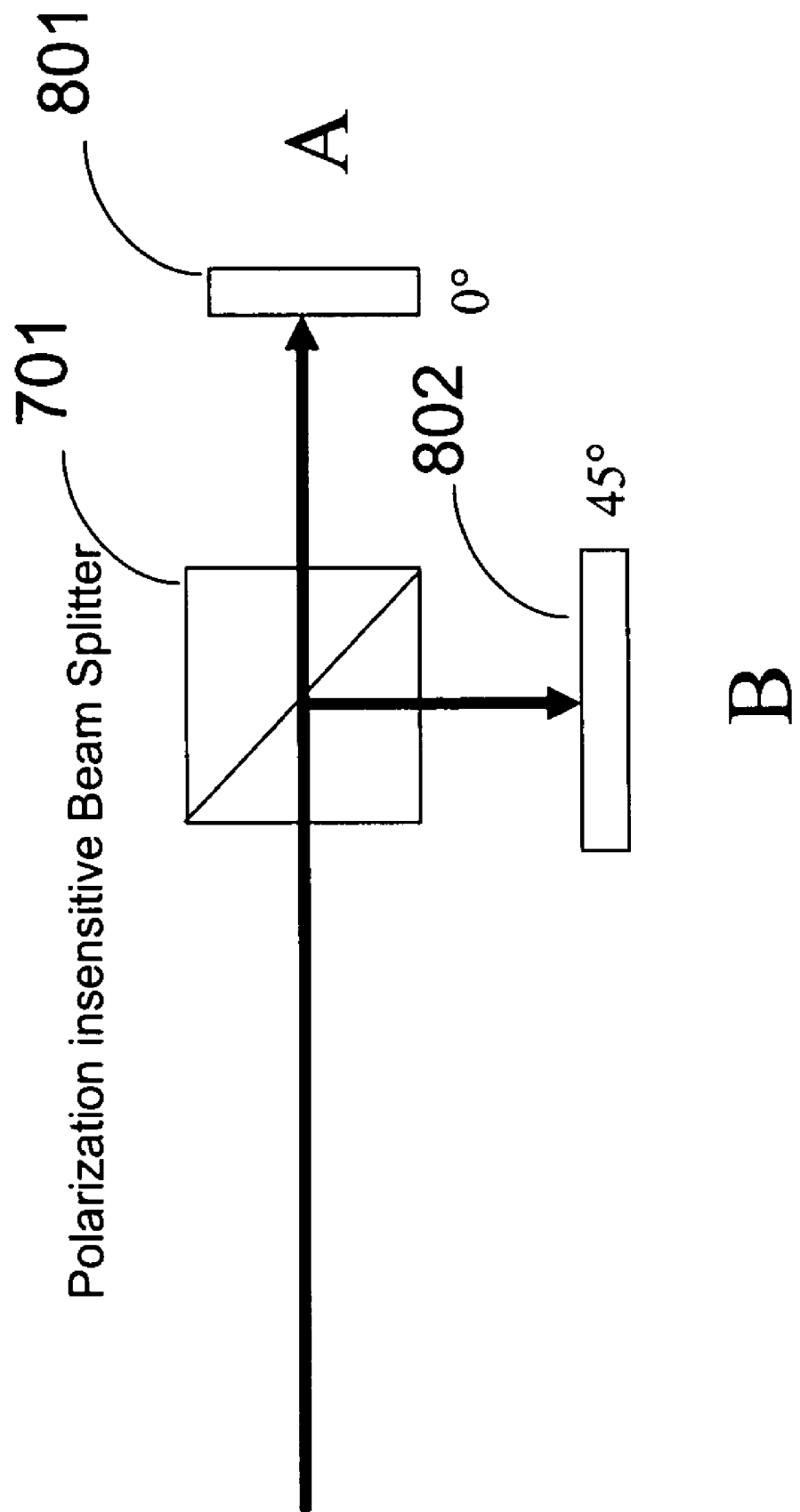
FIG. 17 shows a technique for detection of phase using two polarization sensitive detectors and a polarization insensitive beam splitter.

In one embodiment, a polarimeter is used to measure the state of polarization trajectory, being coupled to a data processor or the like to resolve the phase difference between the two beams into a location. A simpler detection arrangement is possible wherein less complete polarization state information will suffice. The general idea is to project the trace of the polarization evolution, typically represented by points on a Poincaré Sphere, onto a plane, and to normalize the projection into a circular trace centered at an origin. For example, the SOP of the output signal can be a great circle in the S1-S2 plane (i.e., Stokes S3=0). In that case, the angular change of the SOP can be calculated using only two detectors. FIG. 17 shows an embodiment in which detectors A and B are preceded by polarizers 801 and 802, oriented for example at 0 and 45 degrees, respectively. In FIG. 17, the output signal is separated into two equal intensity paths by a polarization insensitive beam splitter 701. The first path passes through a 0 degree polarizer 801, before it is detected by detector A (corresponding to detector 112 in FIG. 3); while the second path passes through a 45 degree polarizer 802, before it is detected by detector B (corresponding to detector 113 in FIG. 3). In such a case, the output SOP trajectory traces a circle on the S1-S2 plane, because S3=0. The output SOP can be directly measured by the two-detector configuration shown in FIG. 17, as follows, whereby the angular difference between different SOP (the phase change between the two arms) can be readily obtained.:

$$S_1=(2I_A-I_0)/I_0, S_2=(2I_B-I_0)/I_0, S_3=0$$

In the case that the output SOP trajectory traces a circle that lies in a plane parallel to the S1-S2 plane (i.e. S3=constant), the projection of the trajectory on an equatorial plane will be a circle, with a radius is less than 1. The radius of the projected circle depends on the value of S3. Because the angular difference between different SOP is preserved when it is projected onto the equatorial plane, the two-detector configuration can also be used to obtain the necessary phase information. The difference between this case and an S3=0 case is that because S3 is a finite value, the sign of S3 cannot be defined. However, only the relative SOP change is of interest. Therefore, the sign of S3 does not affect the measurement, as long as S3 is not so large as to provide a circular trace that is so small that it is difficult to resolve an angular difference. For example, if S3=1, the circular trace is reduced into a single point, from which it is not possible to obtain phase information based on a span of angles around a circular trajectory. The size of the circular trace can, however, can be adjusted according to the invention by controlling the input SOP.

In a case where the output SOP trajectory traces a circle on a plane that is not parallel to the S1-S2 plane, the projection of the trajectory on the equatorial plane is an ellipse instead of a circle. The position of the ellipse usually is not centered at the origin (the center of the equatorial plane). A phase difference between two points on the ellipse, however, can be transformed into an angular difference in SOP on the original circular trajectory, which circular trajectory simply is tilted relative to the equatorial plane. Without loss of information, the projected ellipse advantageously can be normalized by reshaping it into a circular trajectory, whereupon the angular difference can be determined. These steps can be accomplished by the data processor.

The detected signals used to plot the circular configurations (or the elliptical projections of circles) are the intensities measured by the two detectors 112 and 113, shown in FIG. 4. Together with the knowledge regarding the minimum and maximum intensities, the signals detected by the detectors 112, 113 can be used to calculate the S1 and S2 projection, and furthermore to derive the angle between points in a circular projection of the SOP evolution.

The shape of the SOP trace projection normally does not prevent a calculation of phase difference. However, the dimensions of the projected trace can affect the signal to noise ratio. With a larger trace, a more accurate measurement is possible. In a case where the trace is reduced into a small circle, the measurement is less accurate (or not possible if the projection is a point). Similarly if the eccentricity of a projected ellipse is extreme (at worst if the projection of the trace is reduced to a line on the equator), an accurate measurement of phase may not be achieved.

The size of the trajectory is determined by the power relationship between the two components that are combined by the polarization sensitive combiner, and used for output SOP detection. If they have equal intensity, a maximum size trajectory can be obtained (the so-called great circle). The trace is reduced to a point if one component is completely missing. The size of the trajectory can be controlled by polarization controllers, some examples being shown in FIG. 18 and FIG. 19.

The polarization controllers 130 (element A in FIG. 18), 134(B) and 135 (C) can be used to control the size of the trajectory. The polarization controller 133 (element D in FIG. 19) is used to control the shape of the projection of the SOP trace. Polarization controller 130 (A) establishes a polarization state before the light reaches the polarization sensitive beam splitter, such that Ib=Ic. Polarization controller 134 and 135 (B and C) control the polarization before the polarization sensitive combiner, such that I1=I2, and preferably I1 and I2 are at maximum.

Polarization controller 133 (D) controls the shape of the projection. Although the ellipse shape, in general, does not prevent a measurement, as a special situation, the ellipse can be highly eccentric or reduced into a single line. In a re-oriented shape at least approximating a circle (which is a special form of ellipse), the angular difference between two points can be more readily determined. Re-orienting the projection as a circle also permits the application of sine and cosine lookup tables to assist in determining an angular span using a programmed electronic data processor. Polarization controller 133 (D) can avoid such situations by transforming the incoming polarization state to a reoriented state wherein the angle between two points can be more readily discerned. The angle between two points and not the orientation of the projection, is the factor that matters.

In the proposed system, the location of the event is detected directly from the phase. In this case, the polarization, as we discussed above, only affect the trace size and projected the trace shape. As long as the trace is not too small or eccentric, the detection of the event location does not depend on the polarization value. The event location depends on the angular displacement.

Figure 18:
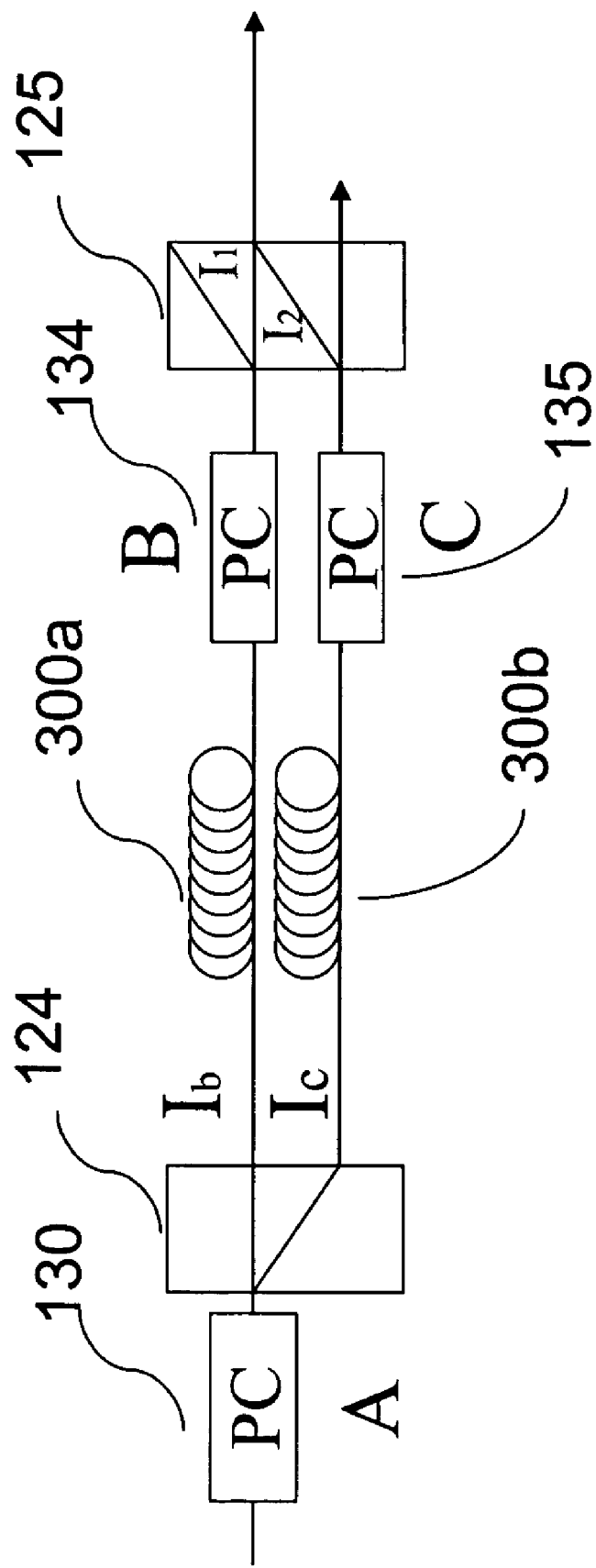
FIG. 18 schematically shows control the size of the trajectory by using polarization controllers.
Figure 19:
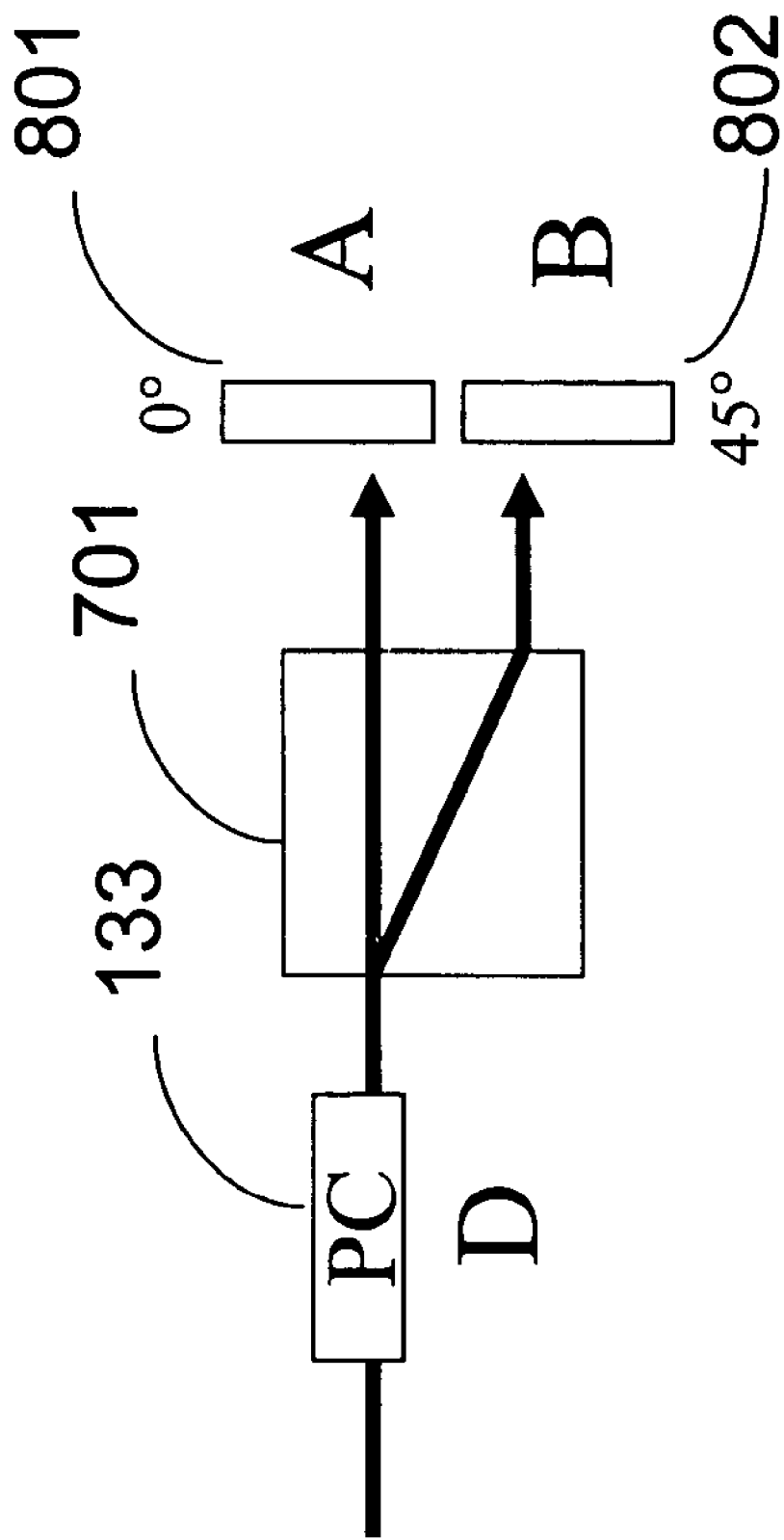
FIG. 19 shows a technique for controlling the shape of the projection of the trajectory including use of a polarization controller.
Figure 20:
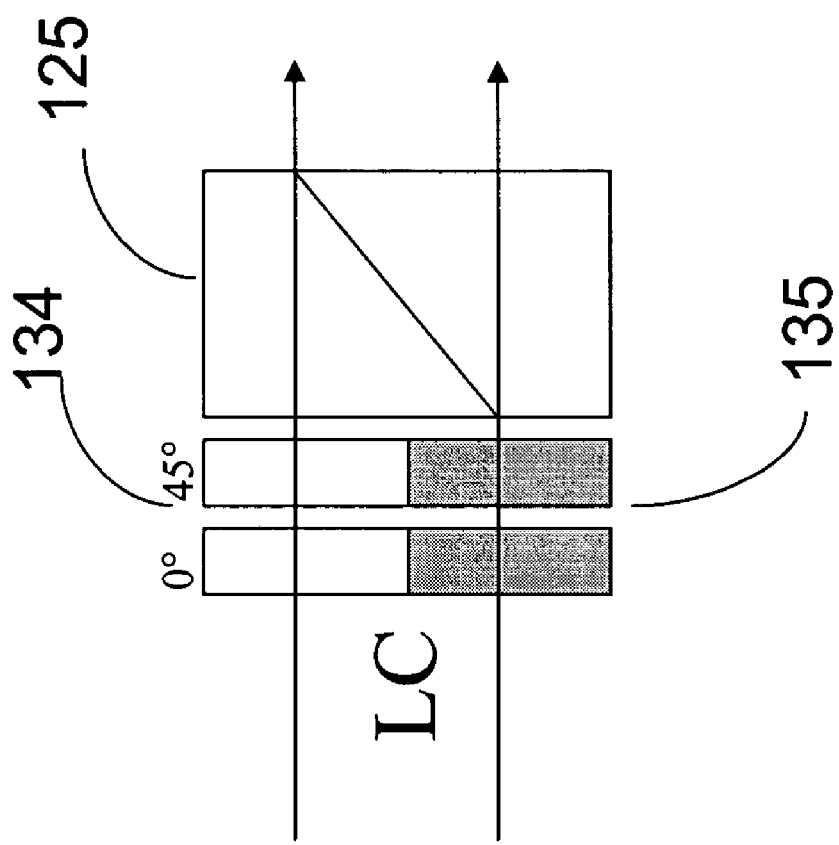
FIG. 20 illustrates use of a patterned liquid crystal cell as a polarization controller.

The configurations with polarization controllers, shown in FIG. 17 through FIG. 19, are non-limiting examples. Other configurations exist. Some further examples can be noted. As shown in FIG. 20, the polarization controllers 134 and 135 of FIG. 18 can be implemented by two patterned Liquid Crystal tunable waveplates, which can be directly attached to the polarization sensitive beam combiner as manufactured. The LC cell contains a patterned electrode, such that polarization controls can be applied independently to the upper arm and the lower arm (distinguished in FIG. 20 by shading). With two patterned waveplates, it is always possible to generate a SOP trajectory that is a great circle. Even without such capability, because the measurement is insensitive to the size of the trajectory (and as long as the trajectory is not too small), accurate measurement can be achieved. Therefore, one patterned LC cell oriented at 45 degree is enough.

Figure 21:
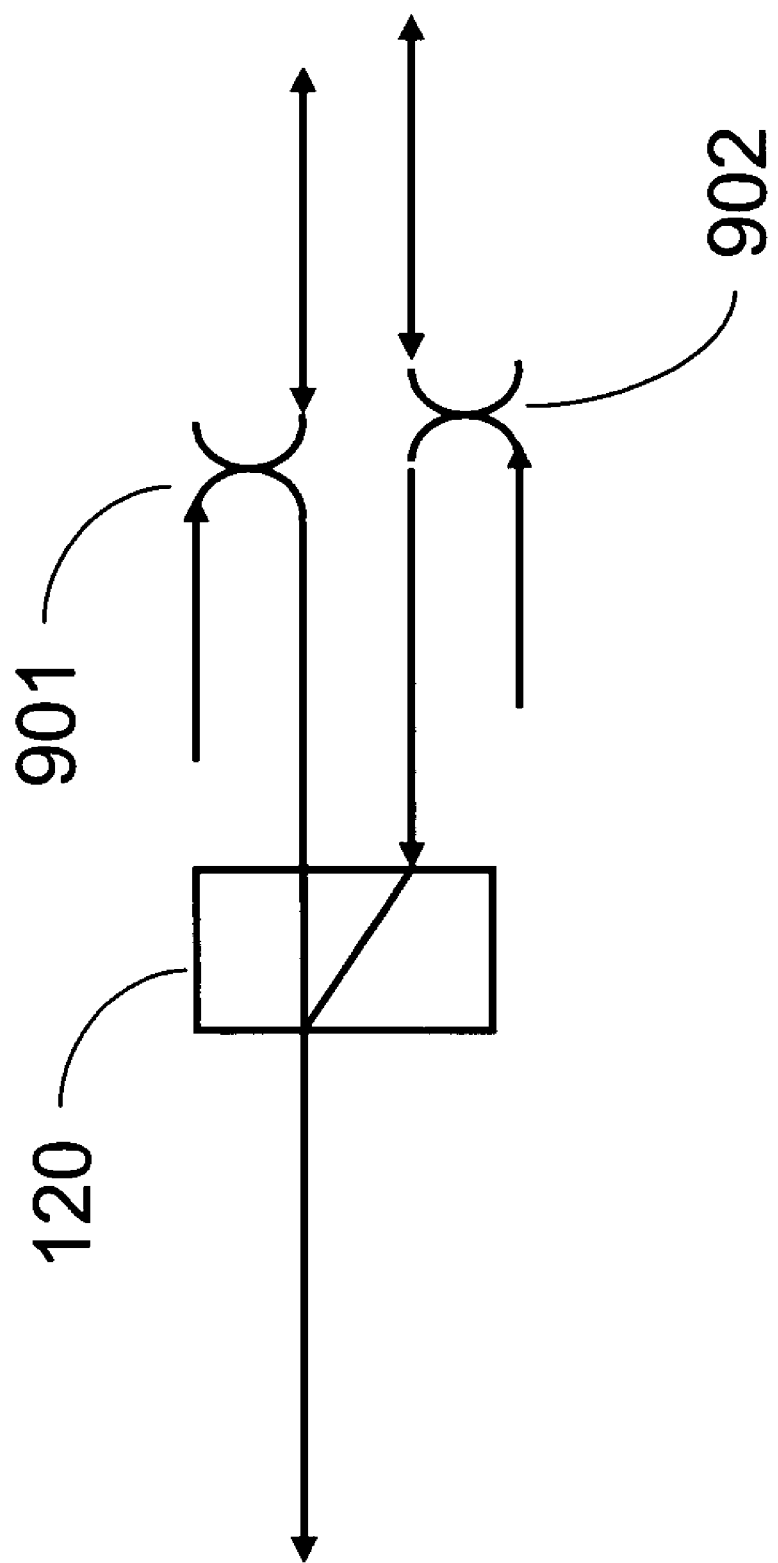
FIG. 21 shows a polarization sensitive beam combination and polarization insensitive beam splitting arrangement.
Figure 22:
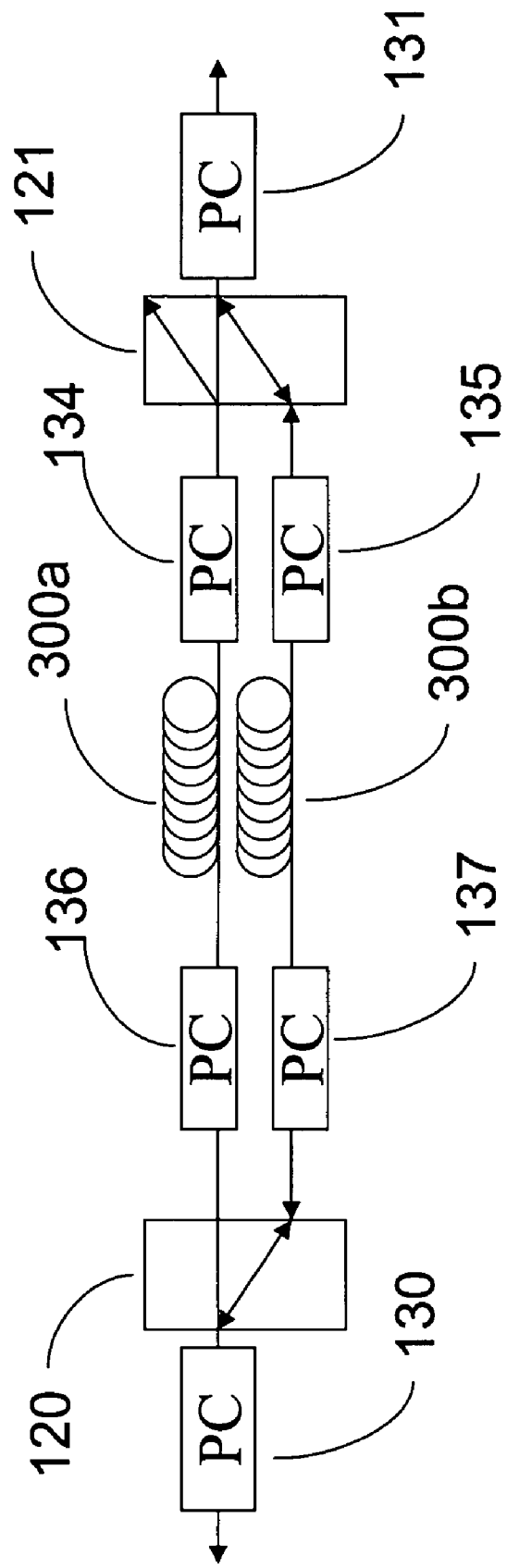
FIG. 22 schematically illustrates bidirectional operation for event location detection.

The polarization controller 130 (A) in FIG. 18 can possibly be avoided if the coupling of the incident light into the system is polarization insensitive. One example of doing this is to use fiber couplers or circulators. Polarization insensitive couplers 901 and 902 are used to route the light in the embodiment shown in FIG. 21. A full counter-propagating schematic is shown in FIG. 22.

Figure 23:
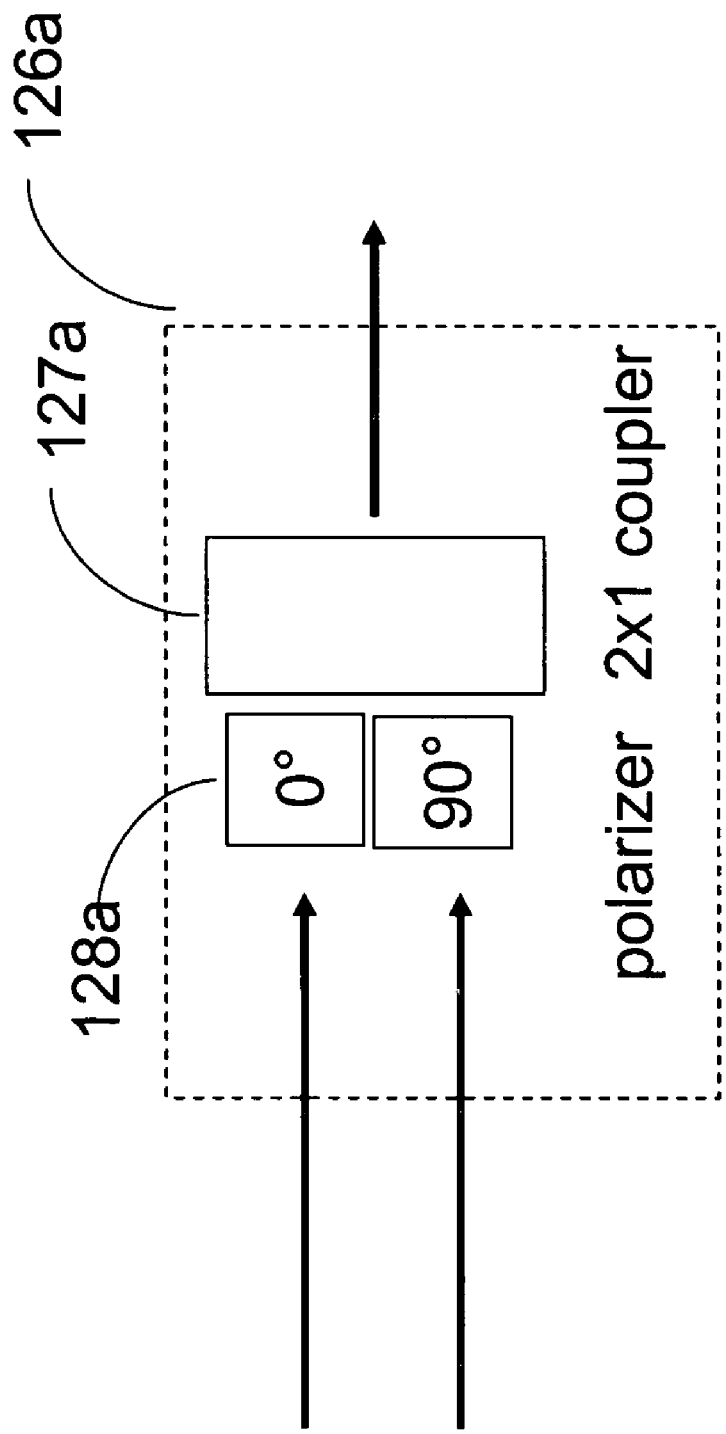
FIG. 23 is an example showing a two-beam polarization sensitive beam combiner.
Figure 24:
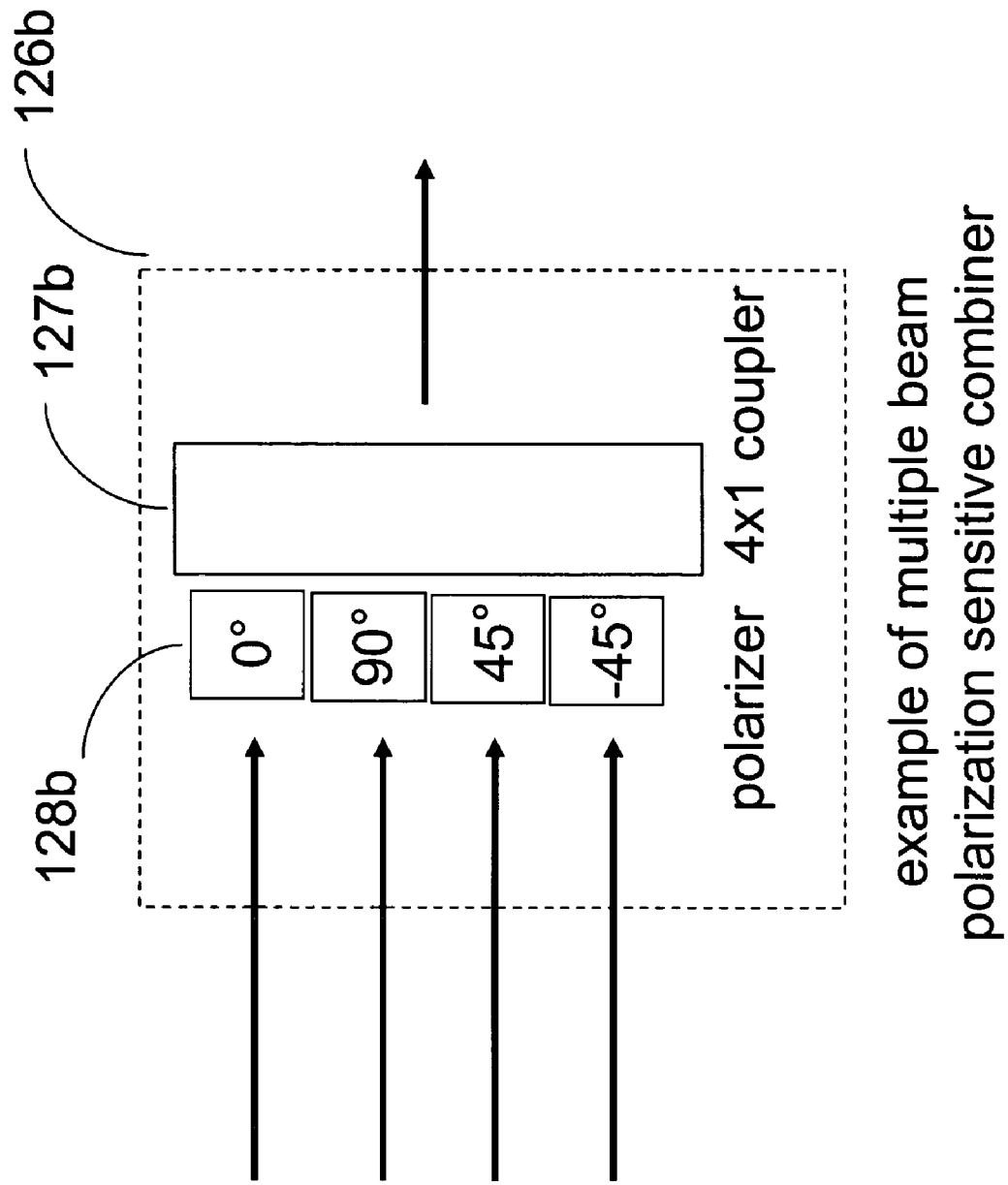
FIG. 24 is an example showing a four-beam polarization sensitive beam combiner.
Figure 25:
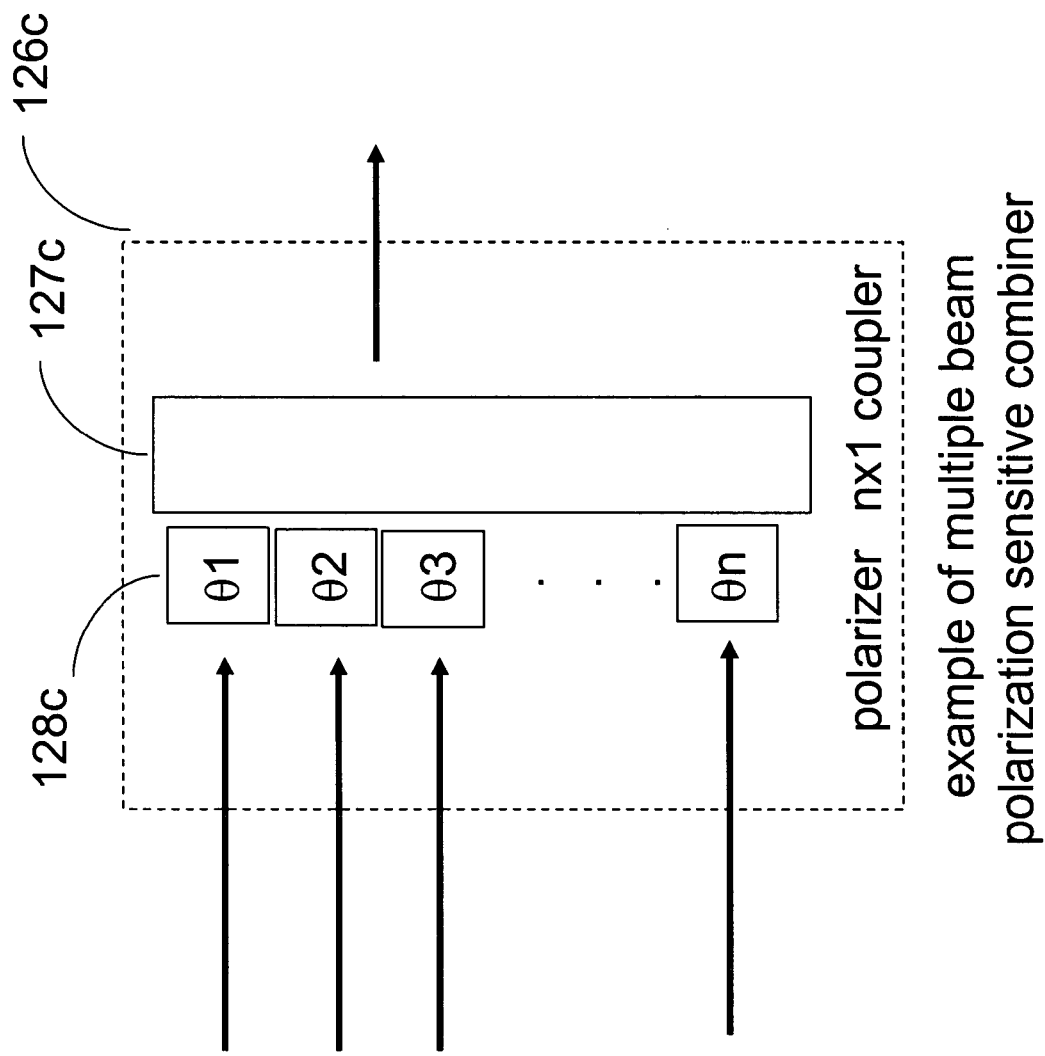
FIG. 25 is an example showing an n-beam polarization sensitive beam combiner.

One example of a two-beam combination is shown in FIG. 23, where two beams are combined together, passing through a 0 and 90 degree polarizer 128a. In this case, the polarization state for the combined beam depends on the phase difference of these two beams. Multiple beams can also be combined with the help of polarization sensitive beam splitter. One such example is shown in FIG. 24, where four beams are combined together; each passing through a polarizer oriented at a specific angle. For combining more than two beams, as shown in FIG. 25, the polarization aspect of the combined beam is somewhat more complicated.

Figure 26:
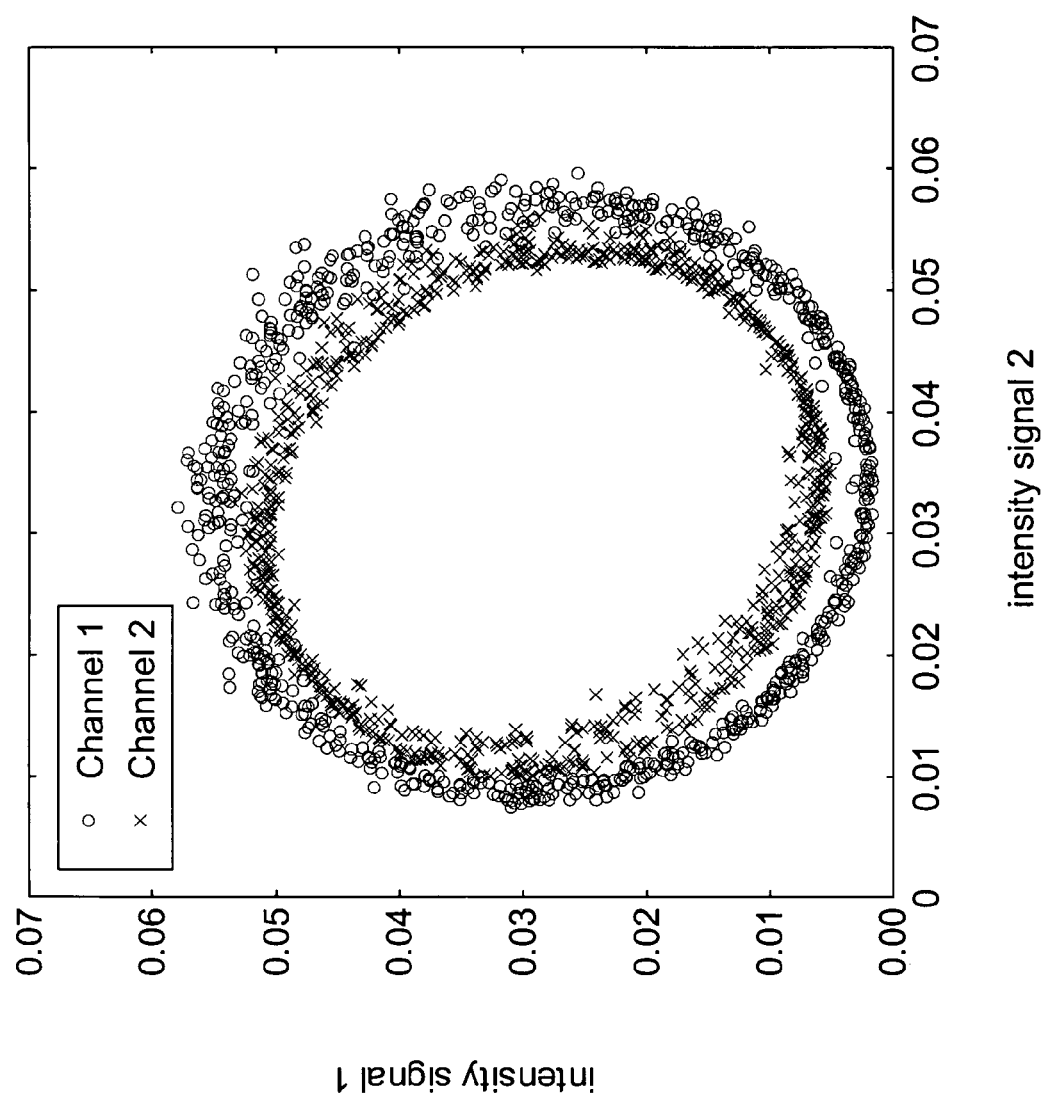
FIG. 26 is a plot of typical intensity traces comparing intensity values measured by sets of two polarization sensitive detectors for each propagating direction.
Figure 27:
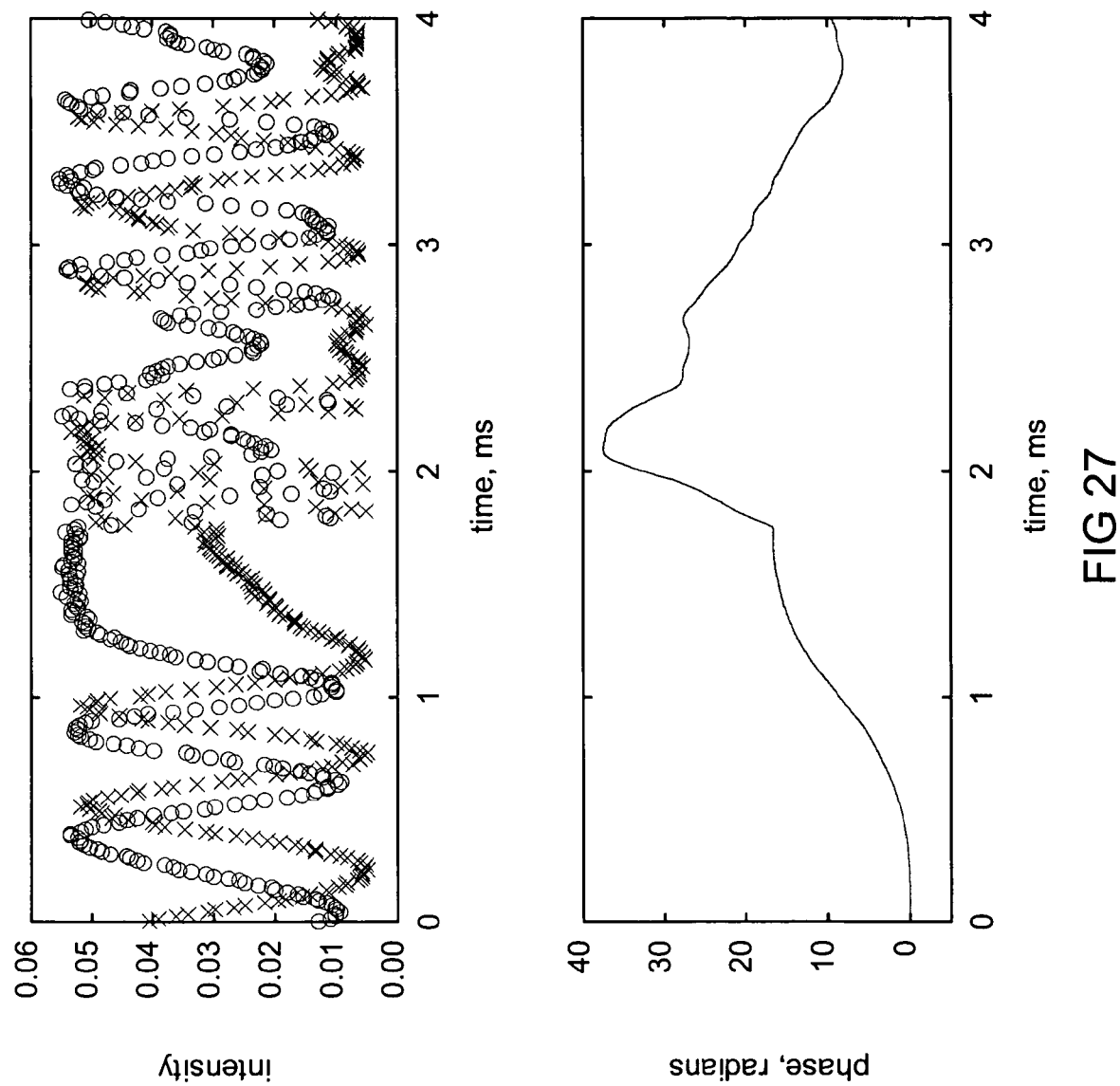
FIG. 27 is a time plot of the two intensities and corresponding phase values calculated from the intensities. The plotted phase value is the angular difference in radians between two consecutive states of polarization, calculated from the two intensities. The intensity as plotted is bounded; and the phase is unbounded.
Figure 28:
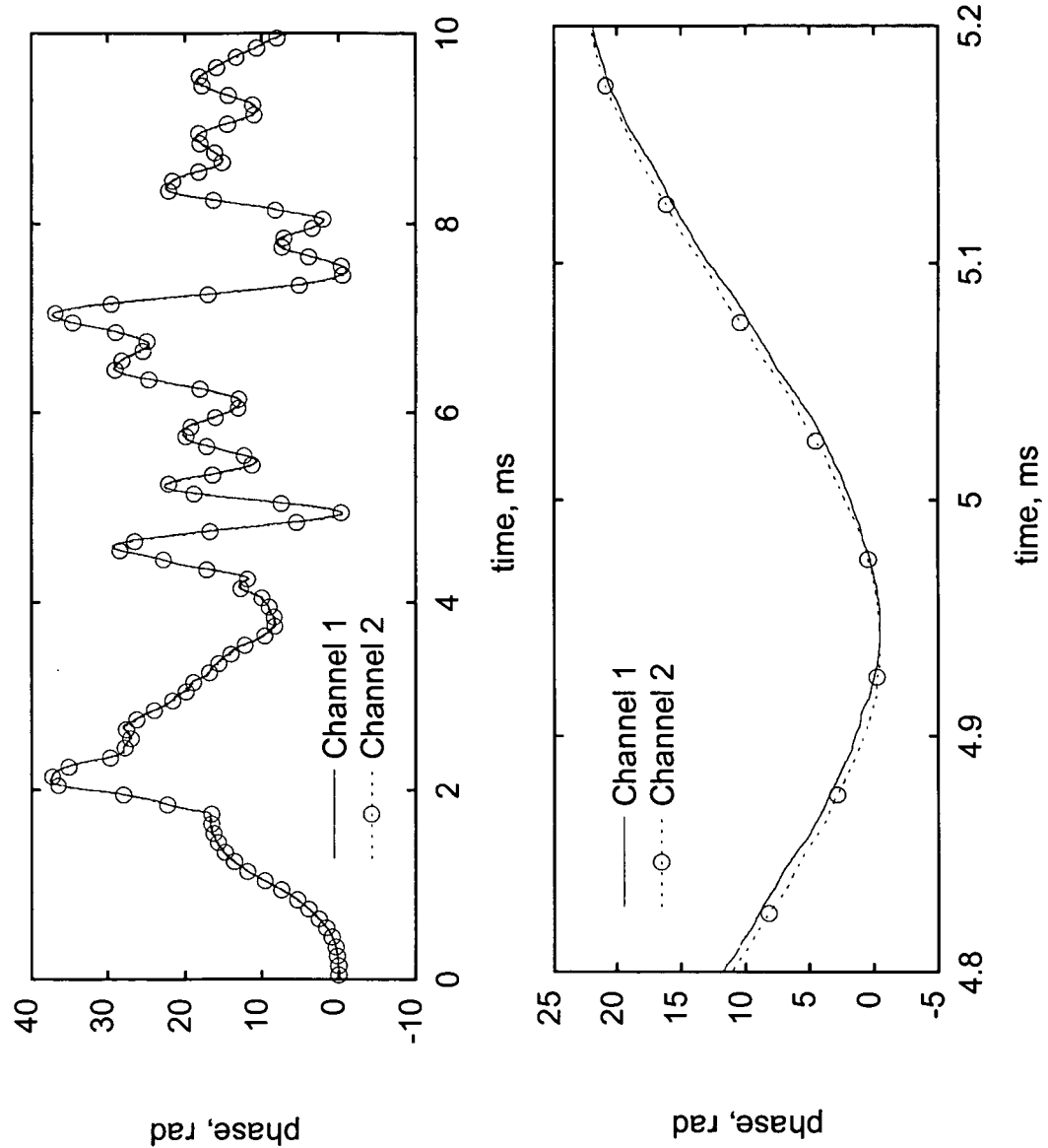
FIG. 28 is a pair of time plots comparing the phase response for the two counter-propagating beams over longer and shorter time scales.

Experiments were conducted to test the concept. FIG. 26 is a typical measurement of the intensity traces for the two channels. From repetitive samples of he the intensities of the two channels, the phase difference between the two arms can be calculated over time, two plots being shown in FIG. 27. Event location is calculated from the time difference of corresponding wave shapes in the counter-propagating beams. FIG. 28, particularly in the lower expanded-time scale plot, a time shift is shown between the responses of the two counter-propagating beams. This is due to the occurrence of an event in the detection zone.

Figure 29:
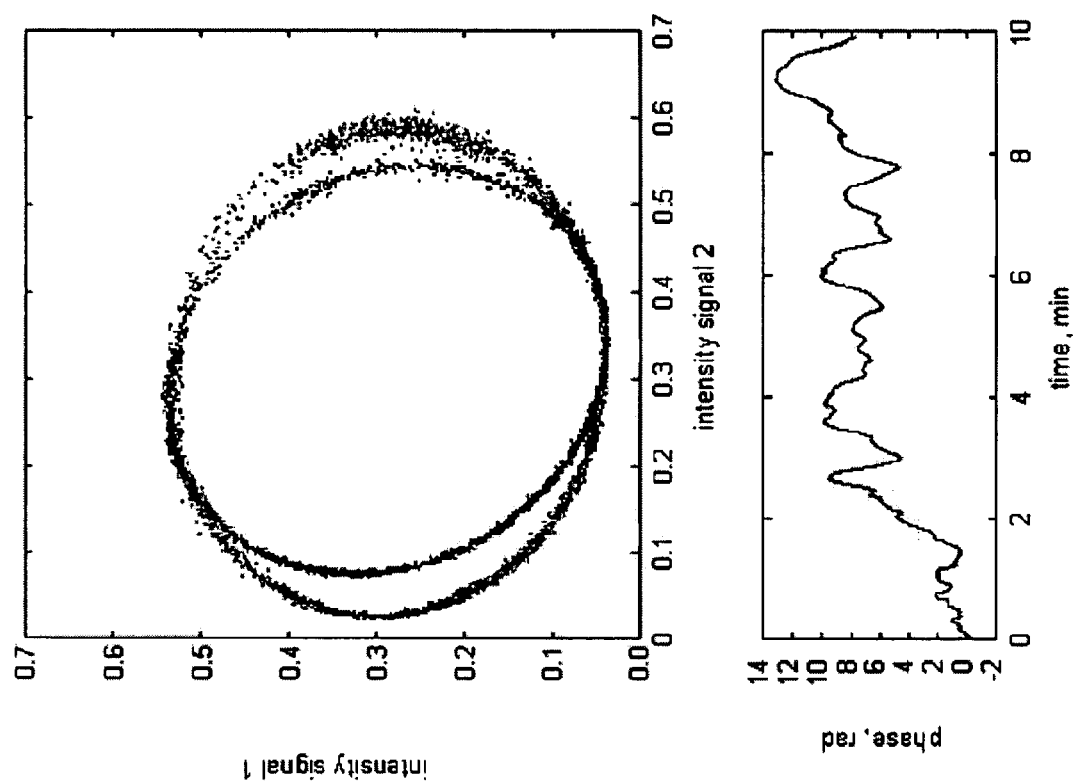
FIG. 29($a$–$e$) are sets of plotted channel intensity traces as in FIG. 6, together with time-phase plots, showing experimental results of the detected signal when there is no disturbance, for different circle sizes on a Poincaré Sphere, in some cases showing reduction from a circle to a spot.
Figure 29:
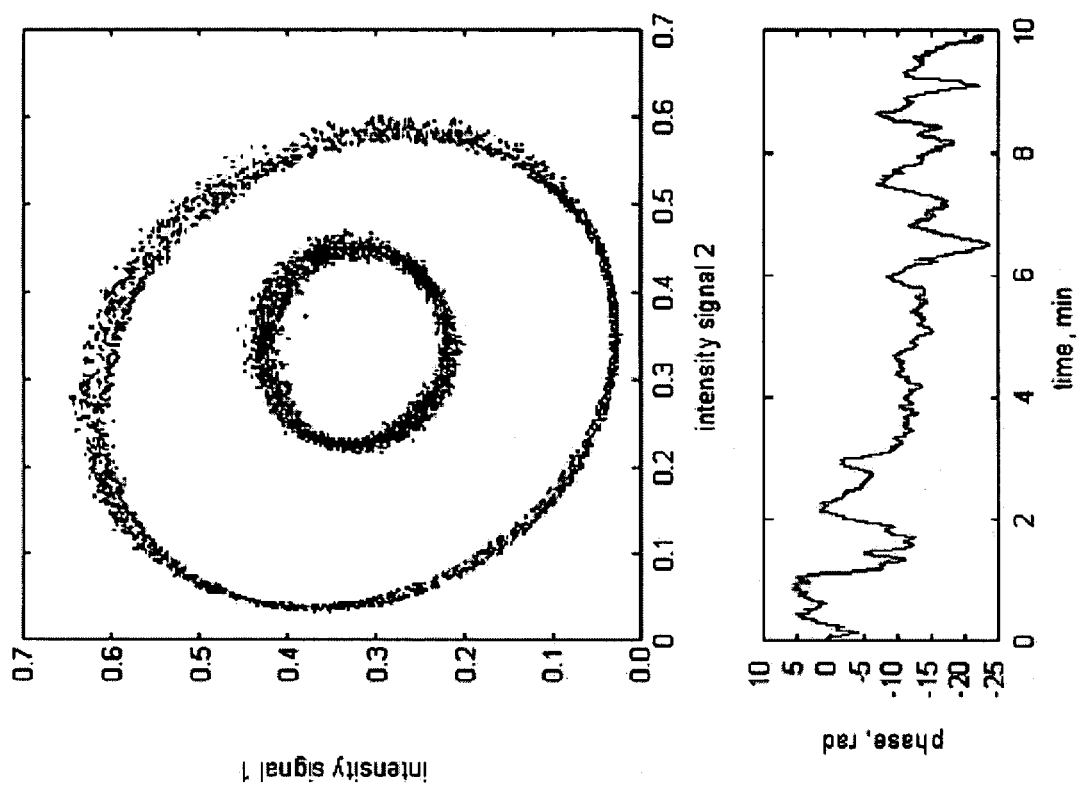
Figure 29:
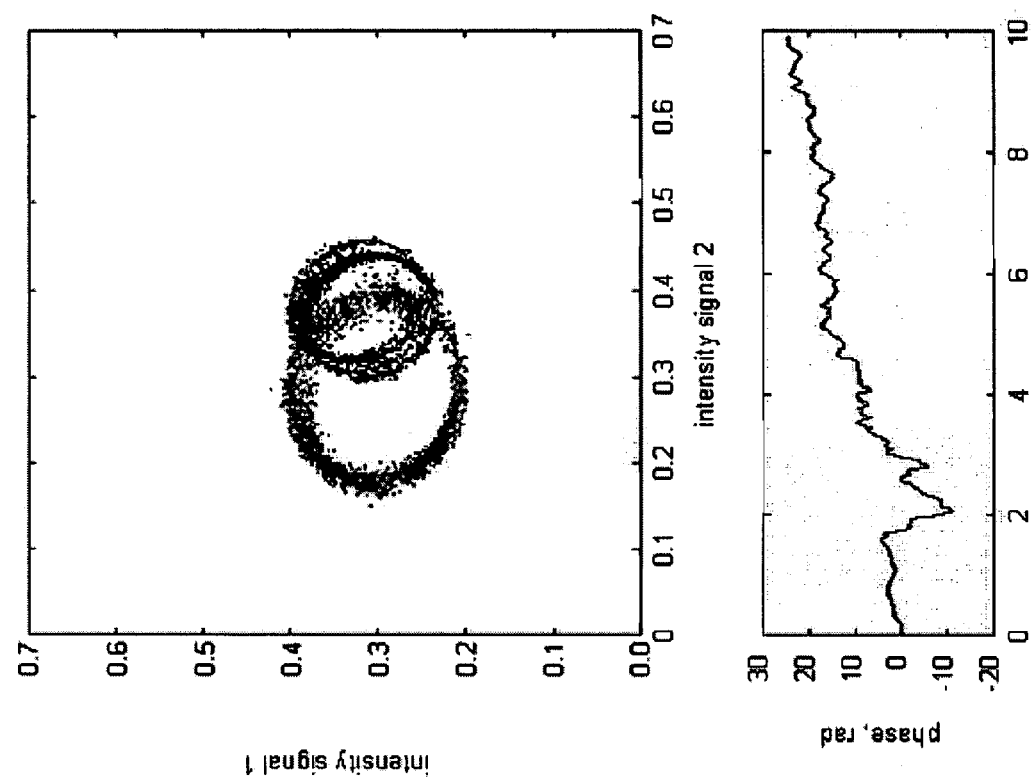
Figure 29:
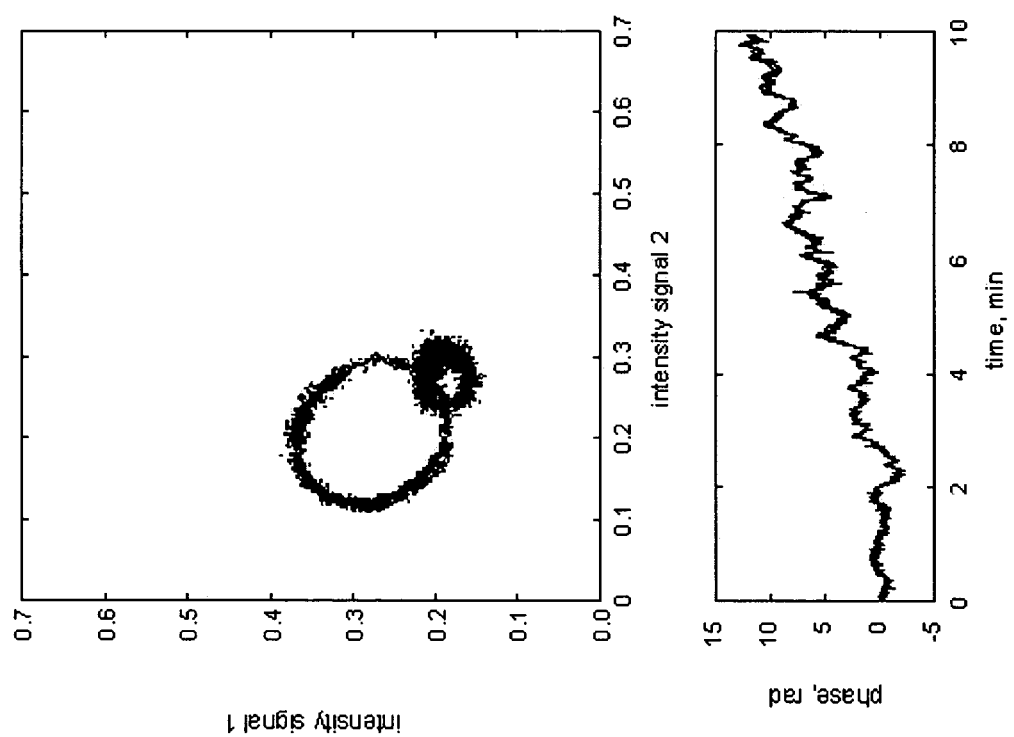
Figure 29:
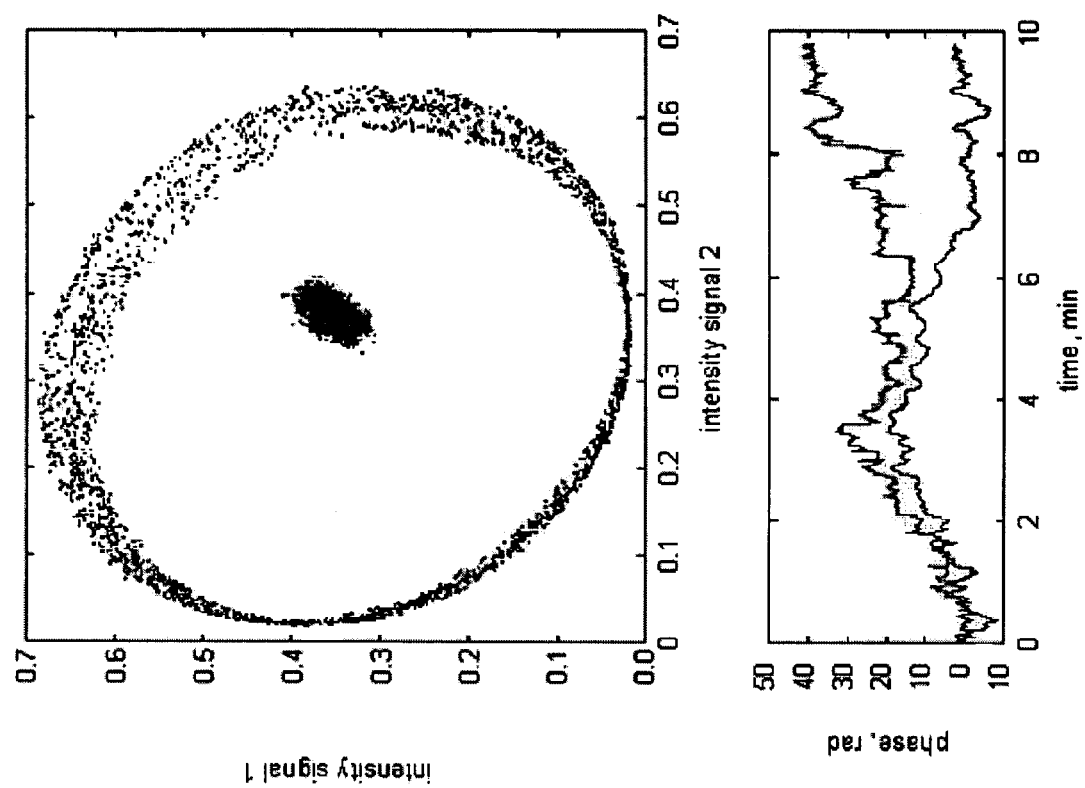

FIG. 29 (a)–(e) show a range of various experimental results in the detected signal, without demonstrating a particular disturbance. In the absence of a disturbance, the calculated phase of the counter-propagating beams should be the same. As shown in these figures, the measurements are normally insensitive to the shape and the size of the projection of the shape. However it can be appreciated that accuracy can be affected if the size of the projection is reduced to a very small circle (as shown in FIG. 29d), or to a point (FIG. 29e) or to a line (not shown in these examples).

Figure 30:
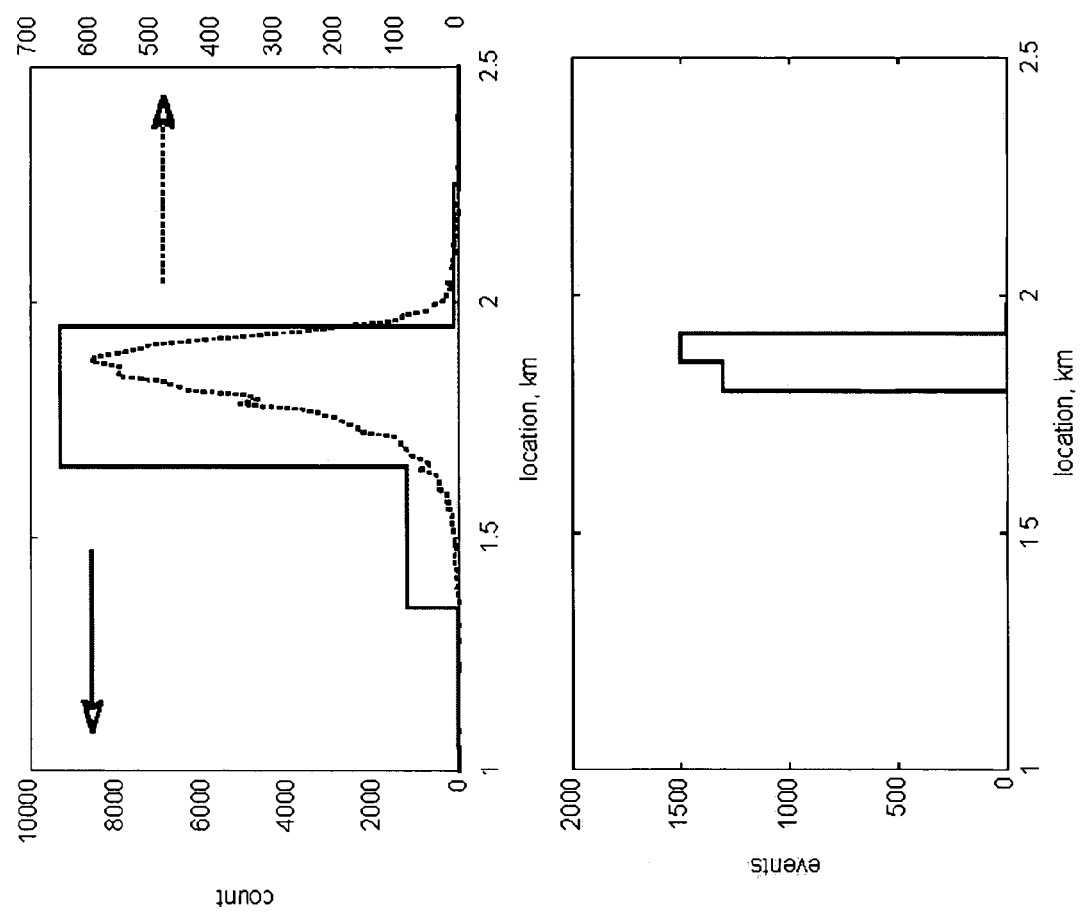
FIG. 30 is a comparison of histograms, the upper graph showing the statistics of location detection accuracy. The rounded curve is the distribution of the location calculated from the same disturbance. The block curve is the distribution quantized according to system resolution. The data acquisition for this experiment was 1 MHz, which corresponded to a system resolution about 200 m in fiber. The accuracy of the location detection is within the resolution of the system and can be improved using a higher speed of data acquisition, as shown by the lower graph, illustrating the statistics of location detection accuracy using 5 MHz data acquisition.

FIG. 30 statistically shows the apparent accuracy of event detection. The event in this case was generated by manually and repeatedly tapping the fiber at a specific location. The data acquisition rate is 1 MHz, therefore the resolution of the time delay is 1 microsecond, which corresponding to about 200 m of distance of light travel inside a single mode fiber. The statistics shown in FIG. 30 suggest that the accuracy of the measurement of the event location may carry a potential error of about one data increment. The resolution of detection can be increased by fast data acquisition. The measurement accuracy can be much improved if high-speed data acquisition components are used in the proposed system, as shown in the lower part of FIG. 30.

Figure 31:
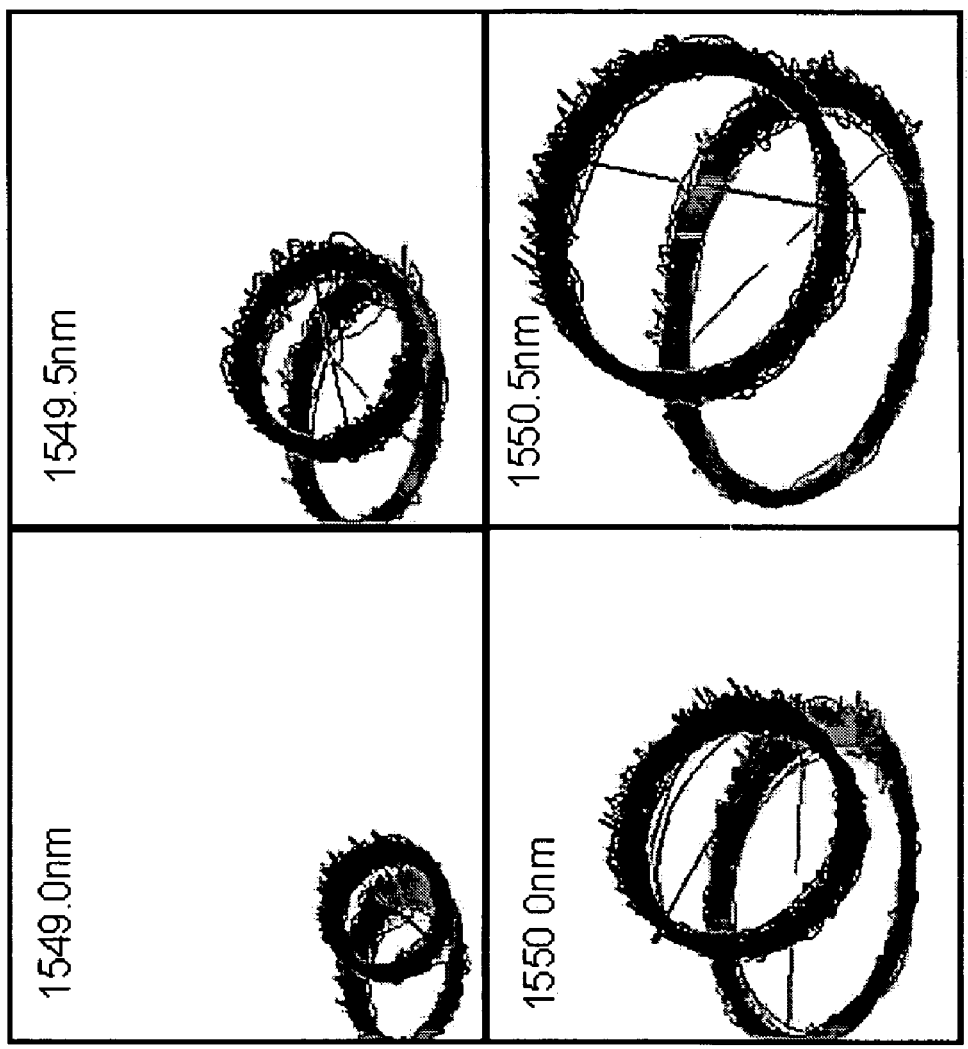
FIG. 31 is a comparative illustration of intensity plots as in FIG. 6, showing that the size of the circular trajectory is in part a function of wavelength, the data being collected for a 1 km fiber system.

FIG. 31 demonstrates the effect of wavelength on the size of the projected circles. As already discussed previously, because the polarization transformation caused by the fiber depends in part on wavelength, the relative relation of the orthogonal polarization components, and hence the size of the projected circles, can be adjusted by changing the operational wavelength. As FIG. 31 shows, a small change in wavelength can substantially alter the size of the circular trajectory which can be used advantageously to enhance the signal to noise ratio for detection of location.

Figure 32:
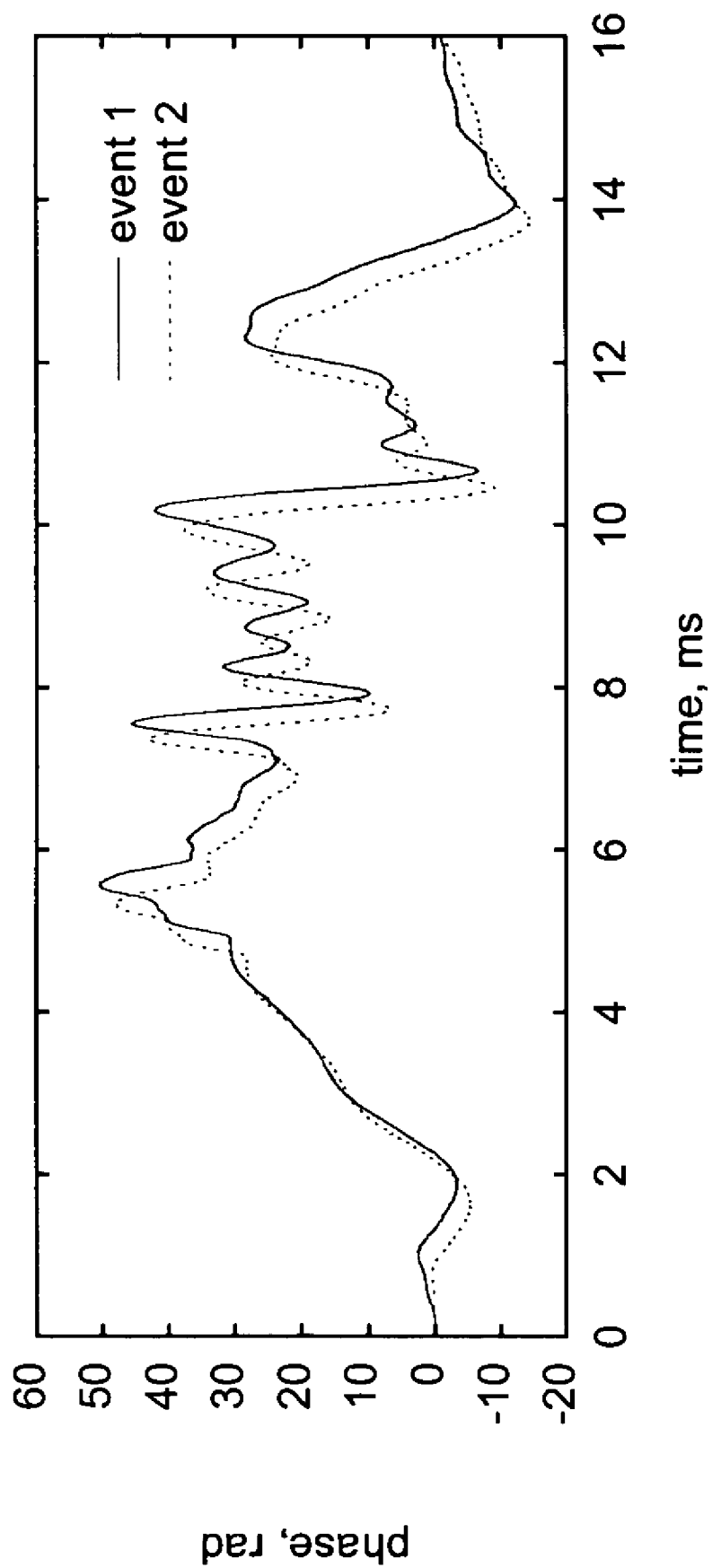
FIG. 32 is a time plot showing characteristic phase responses from a particular event producing a disturbance at a specific location. Event 1 and event 2 are the same event.

Because the proposed system measures the phase difference directly, different events can potentially be distinguished by the type of event (in addition to its location) if the events have characteristic phase responses. The shape of the phase response depends on the way that the fiber is disturbed, and a particular type of event may have a recognizable phase variation waveform over time due to the physical changes that affect the fiber, such as vibrating parts, stress and relation, etc. FIG. 32 shows an event with an exemplary set of deflection and ringing aspects. Signature phase variations as shown in FIG. 32 can be matched to received waveforms and may help to characterize some types of events as known and non-threatening. An example is a recurring natural event (such wind pressure on a fence). Another example is a low level event (such as the movement of a small animal, etc.) for which it may be undesirable to trigger an alarm except during times of particularly high security.

The polarization evolution through a single mode fiber carries information representing the phase. For a single fiber configuration, the phase difference between two eigenmodes can be obtained by direct measurements using a polarimeter, or by the use of polarization sensitive elements, such as polarizer, without a full polarimeter being required.

Several advantageous embodiments have been discussed as examples, and other arrangement are also apt for certain needs. The proposed technology is useful for a distributed sensor associated with a fiber carrying fence, or a perimeter defense system with in-ground fiber. A fiber can be integrated into a wall. A fiber can be routed along a series of doors, windows and other portals. A fiber can be routed laterally across a path or longitudinally to assess progress along the path. Apart from security applications, the same sort of location sensing can be useful in industrial positioning, counting, level control and robotic motion applications. The invention also is applicable to traffic control system. Numerous other possibilities should now be apparent from this disclosure.

Figure 33:
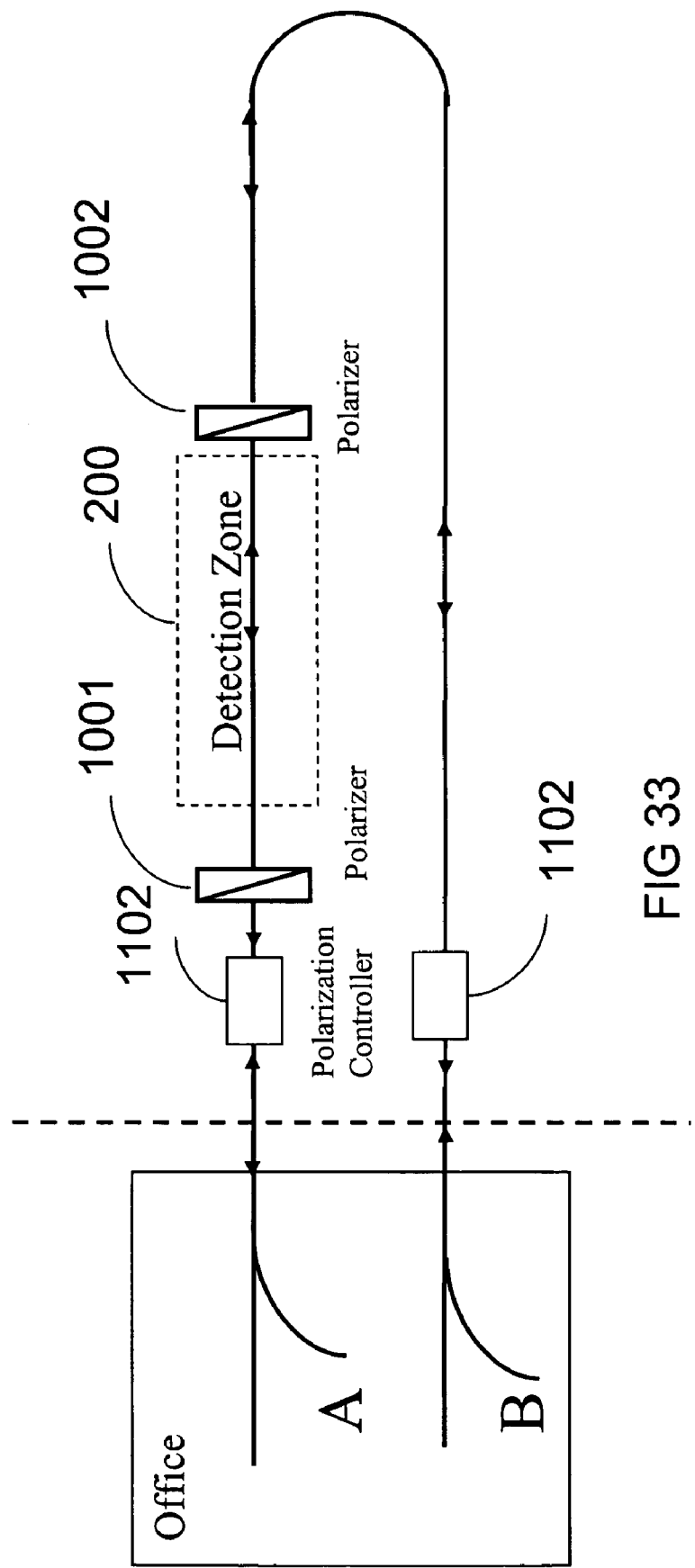
FIG. 33 is a block diagram showing the layout of a distributed sensing system based on the invention.

In FIG. 33, the detection zone 200 has one fiber between polarizers 1001, 1002. Because different polarization components experience different accumulated phase, the configuration shown in FIG. 33 is comparable to an interferometer with only one path. The polarizers 1001 and 1002 at the ends select which polarization component to be used to interfere. Because of the first polarizer will cause the intensity to change when the input assumes a different SOP, two polarization controllers 1102 and 1103, one on each of the paths (one for each direction of light propagation), are needed to optimize the SOP in front of the respective polarizer, so that a maximum intensity is coupled from the light to the first polarizer encountered. An advantage here is that the configuration only needs a single fiber in the sensing area.

Figure 34:
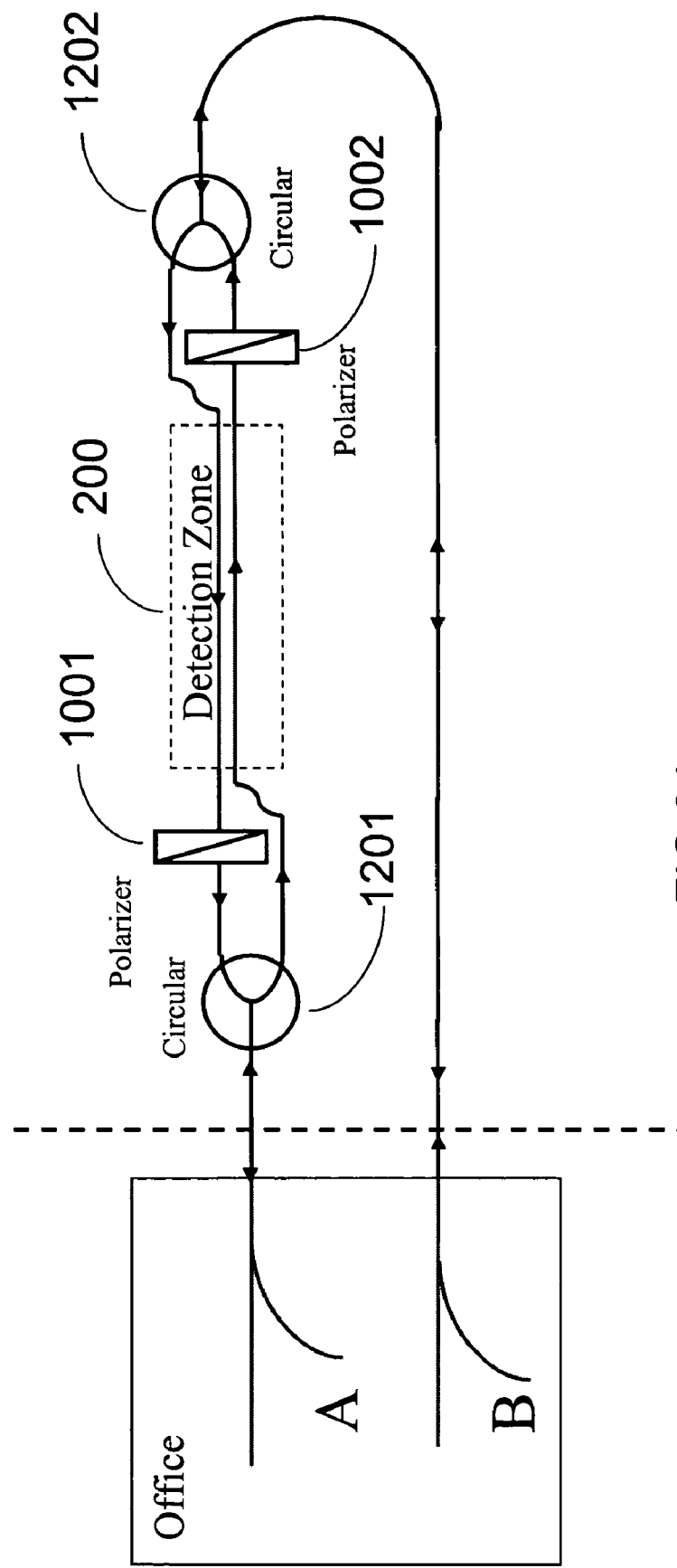
FIG. 34 is a block diagram as in FIG. 33, showing an alternative layout for a distributed sensing system based on the birefringent effect.

As shown in FIG. 34, the sensing area 200 for a double pass configuration contains two fibers. The problem associated with obtaining maximum intensity is solved by the use of polarization insensitive circulators 1201 and 1202.

Any disturbance inside the sensing area generates two intensity responses, one for each light path. The difference in time between these two intensity responses allows location of the disturbance by calculating back to a point in the zone 200.

A disturbance occurring outside the sensing area may cause an intensity change. In the embodiment of FIG. 34, a disturbance outside of zone 200 only affects one light path. For the other path, the polarizer is before the disturbance. Only a disturbance inside the sensing area 200 is locate such that the disturbance is before the polarizer for both light paths. Another advantage for the double pass configuration is that it does not require any polarization control device because there is no need to optimize the incident SOP.

According to another inventive aspect, a disturbance detection and locating system as discussed can be used in a secure communication system, particularly in conjunction with optical fibers that are used for communication and detection at the same time. If an attempt is made to tap the optical fiber, or if other activities in proximity with the fiber even disturb the fiber, a phase disturbance occurs that can be detected in the same manner as detection of an event in an intrusion control system In such an embodiment, the optical communication channel may be carried over the same fibers as the sensing system or may simply be laid in proximity with the sensing fiber. For example, in a multi-fiber optical cable, a certain number of fibers can function as intrusion sensing fibers while using the rest of the fibers for data communications. As another example, the same fiber can be used both for the intrusion detection and carrying data, in a time division or wavelength division multiplexed manner. In that case multiple data channels can be carried over the same fiber while using one channel (or any number) for detection of intrusion, disturbance or the like.

The invention has been described in connection with a number of advantageous embodiments, but it should be appreciated that the invention is also applicable to other embodiments that are encompassed within the scope of the appended claims. Reference should be made to the claims rather than the foregoing description in order to assess the scope of exclusive rights claimed.

We claim:

1. An apparatus for detecting and locating a disturbance, comprising:
    at least one light source;
    an optical system comprising at least one optical waveguide, the optical waveguide having at least one detection zone defining a length, wherein a disturbance to be detected and located can occur at a place that can be near one or another of respective ends of the detection zone;
    wherein the optical system is configured to carry signals along at least two counter-propagating optical channels extending in opposite directions along said length of the detection zone such that the disturbance produces a phase variation between polarization components, originating at the place of the disturbance;
    at least one beam separator coupled to the optical system, wherein the beam separator develops at least two beams coupled into said two counter-propagating optical channels, respectively;
    at least one polarization sensitive beam combiner operative selectively to combine polarization components of said at least two beams traveling along the optical waveguide, the polarization sensitive beam combiner being coupled to the optical waveguide so as to act upon at least one of said two counter-propagating optical channels, where said at least one of said two counter-propagating optical channels is propagating in a direction that is one of toward the detection zone and away from the detection zone;
    at least one polarization sensitive detector coupled to the optical waveguide;
    a data processing unit coupled to the polarization sensitive detector, the data processing unit being operable to localize the place of the disturbance to a point along said length, between said ends of the detection zone, from a difference in time of propagation of the phase variation in said opposite directions.

2. The apparatus of claim 1, further comprising a wavelength tuning control coupled to control said light source.

3. The apparatus of claim 1, wherein the light source is coupled to inject light into both of said channels.

4. The apparatus of claim 1, wherein the light source comprises at least two light sources, respectively coupled to said at least two channels.

5. The apparatus of claim 1, wherein, the light source is a coherent laser source.

6. The apparatus of claim 1, wherein the optical waveguide comprises at least one optical fiber in the detection zone, and the counter-propagating beams are passed through said at least one optical fiber in the detection zone.

7. The apparatus of claim 6, wherein the optical waveguide comprises at least two optical fibers that are coextensive at least in the detection zone, and wherein both of said at least two optical fibers are subject to the disturbance in the detection zone.

8. The apparatus of claim 6, wherein the optical fiber in the detection zone is a single mode optical fiber.

9. The apparatus of claim 1, wherein the polarization sensitive beam combiner is configured to combine orthogonal polarization components for said at least two beams for at least one of said counter-propagating optical channels.

10. The apparatus of claim 1, wherein the polarization sensitive detector is operable at least partly to resolve a polarization state derived from at least one of said counter-propagating optical channels.

11. The apparatus of claim 1, wherein the polarization sensitive detector comprises a polarimeter.

12. The apparatus of claim 1, wherein the polarization sensitive detector is operable at least partly to resolve a polarization attribute of each of said counter-propagating optical channels, by combining signals from the beams traversing the channels, and wherein the data processor localizes the place of the disturbance from a time relationship of said polarization attribute of said beams.

13. The apparatus of claim 1, wherein the polarization sensitive detector comprises at least two photo detectors, each proceeded by a polarizer.

14. The apparatus of claim 13, wherein said polarizers preceding said at least two photo detectors are oriented at 45 degrees relative to one another.

15. The apparatus of claim 1, wherein the data processing unit coupled to the polarization sensitive detector calculates a polarization response for at least one of said counter-propagating channels and converts the polarization response into a phase response.

16. The apparatus of claim 1, wherein the data processing unit is operable to derive a phase response from polarization responses of the counter propagating channels upon occurrence of the disturbance, and to calculate from the phase response a locality of the disturbance at least a point within a tolerance.

17. The apparatus of claim 1, wherein said beam separator is polarization insensitive.

18. The apparatus of claim 1, wherein said beam separator is polarization sensitive.

19. The apparatus of claim 1, wherein said beam separator is operable to separate an incident light beam into two orthogonally polarized sub-beams.

20. The apparatus of claim 1, wherein said beam combiner is configured to join at least two polarization components of at least two said beams for at least one of said at least two counter-propagating optical channels.

21. The apparatus of claim 20, wherein said at least two polarization components are orthogonal components.

22. The apparatus of 1, further comprising at least one polarization controller operable for altering a polarization of the waveguide.

23. The apparatus of claim 22, wherein at least one polarization controller is coupled between the light source and the beam separator.

24. The apparatus of claim 23, wherein the beam separator is polarization sensitive, whereby the polarization controller affects a ratio of intensity of light traveling in one of two opposite directions on a path including the detection zone.

25. The apparatus of claim 22, wherein at least one polarization controller is coupled between the beam separator and the beam combiner.

26. The apparatus of claim 25, wherein the polarization controller is coupled along the optical waveguide so as to affect a polarization state of each of the counter-propagating optical channels, before said channels are combined by the polarization sensitive beam combiner.

27. The apparatus of claim 22, wherein at least one polarization controller is coupled between the beam combiner and the polarization sensitive detector.

28. The apparatus of claim 22, wherein the polarization controller is operable at least in one mode as a polarization scrambler for obtaining diverse polarization states.

29. The apparatus of claim 1, wherein the data processing unit is programmable to resolve the place of the disturbance from polarization information detected by said polarization sensitive detector.

30. The apparatus of claim 1, wherein the polarization sensitive beam combiner is configured to combine polarization components of said counter-propagating optical beams and comprises a birefringent crystal.

31. The apparatus of claim 1, wherein a detection configuration having a least one said detection zone is provided from at least one said optical waveguide arranged to encompass at least one of a detection line, a perimeter around an area, a pattern encompassing the area using spaced lines, a pattern encompassing a border of a volume, a pattern in the volume using spaced lines, and a path passing irregularly through successive zones of interest.

32. The apparatus of claim 1, wherein said polarization sensitive detector is substantially wavelength insensitive.

33. The apparatus of claim 1, further including a data transmission path wherein the optical waveguide includes at least one optical beam operable for data transmission.

34. The apparatus of claim 33, wherein an operating wavelength of said at least one light source for producing said at least two beams is different from a wavelength used for said data transmission.

35. The apparatus of claim 34, wherein the optical beam operable for data transmission is carried over at least one same channel as the counter-propagating optical channels.

36. The apparatus of claim 1, further comprising a communication device operable to report information regarding the disturbance.

37. The apparatus of claim 36, wherein the communication device comprises one of a wired and wireless reporting link to a remote location.

38. An apparatus for detecting and locating a disturbance, comprising:
at least one light source;
an optical system comprising at least one optical waveguide, the optical waveguide having at least one detection zone defining a length, wherein the disturbance can occur at any place in the detection zone;
wherein the optical system is configured to carry signals along at least two counter-propagating optical channels;
at least one beam separator coupled to the optical system, wherein the beam separator develops at least two beams coupled into said two counter-propagating optical channels, respectively;
at least one polarization sensitive beam combiner operative selectively to combine polarization components of said at least two beams traveling along the optical waveguide, the polarization sensitive beam combiner being coupled to the optical waveguide so as to act upon at least one of said two counter-propagating optical channels, where said at least one of said two counter-propagating optical channels is propagating in a direction that is one of toward the detection zone and away from the detection zone;
at least one polarization sensitive detector coupled to the optical waveguide;
a data processing unit coupled to the polarization sensitive detector, the data processing unit being operable to localize the place of the disturbance in the detection zone; and,
wherein the polarization sensitive beam combiner is configured to combine polarization components of said at least two beams of the counter-propagating optical channels, wherein the combined output beams are further processed by an additional polarization sensitive combiner so as to collect at least some light that is rejected by said at least one polarization sensitive beam combiner, and further comprising a switch for selectively changing between outputs of said at least one and said additional beam combiner.

39. An apparatus for detecting and locating a disturbance, comprising:
at least one light source;
an optical system comprising at least one optical waveguide, the optical waveguide having at least one detection zone defining a length, wherein the disturbance can occur at any place in the detection zone;
wherein the optical system is configured to carry signals along at least two counter-propagating optical channels;
at least one beam separator coupled to the optical system, wherein the beam separator develops at least two beams coupled into said two counter-propagating optical channels, respectively;
at least one polarization sensitive beam combiner operative selectively to combine polarization components of said at least two beams traveling along the optical waveguide, the polarization sensitive beam combiner being coupled to the optical waveguide so as to act upon at least one of said two counter-propagating optical channels, where said at least one of said two counter-propagating optical channels is propagating in a direction that is one of toward the detection zone and away from the detection zone;
at least one polarization sensitive detector coupled to the optical waveguide;
a data processing unit coupled to the polarization sensitive detector, the data processing unit being operable to localize the place of the disturbance in the detection zone; and,
wherein the polarization sensitive beam combiner is configured to combine polarization components of said at least two beams of the counter-propagating optical channels, wherein the polarization sensitive beam combiner comprises a first birefringent crystal, and further comprising an additional polarization sensitive combiner comprising a second birefringent crystal, the second birefringent crystal having an optical length that is different from an optical length of the first birefringent crystal, so as to cause the second birefringent crystal to collect at least some light that is rejected by the first birefringent crystal, and further comprising a switch for selectively changing between outputs of the first and second birefringent crystal.

40. An apparatus for detecting and locating a disturbance, comprising:

at least one light source;

an optical system comprising an optical waveguide, the optical waveguide having at least one detection zone defining a length, wherein the disturbance can occur at any place between ends of the detection zone;

wherein the optical system is configured to carry signals along at least two counter-propagating optical channels extending in opposite directions along said length of the detection zone;

wherein the disturbance produces a phase variation between polarization components, that propagates a different distances in said opposite directions as the disturbance occurs closer to or farther from said ends of the detection zone;

at least one polarization sensitive beam combiner operative selectively to combine polarization components of said at least two beams traveling along the optical waveguide, the polarization sensitive beam combiner being coupled to the optical waveguide so as to act upon at least one of said two counter-propagating optical channels, where said at least one of said two counter-propagating optical channels is propagating in a direction that is one of toward the detection zone and away from the detection zone;

at least one polarization sensitive detector coupled to the optical waveguide;

a data processing unit coupled to the polarization sensitive detector, the data processing unit being operable to localize the place of the disturbance to a point along said length and between said ends of the detection zone from a time difference of propagation of the phase variation in said opposite directions.

41. An apparatus for detecting and locating a disturbance, comprising:

at least one light source;

at least one optical switch operable to couple the light source to at least one of a plurality of optical sub-systems, wherein the optical sub-systems each comprise at least one optical waveguide, and each define at least one detection zone having at least one of a length and width and the the disturbance can occur at a point therein, and thereby detectably affect the optical waveguide to produce a phase variation in polarization components at the point of the disturbance, wherein at least an active subset of said optical sub-systems carries at least two counter-propagating optical channels when operatively coupled to the light source, proceeding in opposite directions along a path through the detection zone between ends;

at least one beam separator operatively coupled to the active subset of the optical systems, wherein the beam separator develops at least two beams that are coupled into the counter-propagating optical channels;

at least one polarization sensitive beam combiner operative selectively to combine polarization components from at least one of said at least two beams, the polarization sensitive beam combiner being coupled to the optical waveguide so as to act upon at least one of said two counter-propagating optical channels propagating in a direction that is one of toward the detection zone and away from the detection zone;

wherein the beams coupled into the counter-propagating optical channels are further coupled to at least one polarization sensitive detector for sensing said beams as affected by the disturbance;

a data processing unit coupled to the polarization sensitive detector, the data processing unit being operable to localize the place of the disturbance to said point, along the path through the detection zone between said ends, based on a time difference of propagation of the phase variation in said opposite directions.

42. A method for detecting and localizing a disturbance, comprising:

applying at least one light source to an optical system having at least one optical waveguide, the optical waveguide having at least one detection zone defining a length, wherein the disturbance can occur at any place spaced between ends of the detection zone and the optical system is configured to carry signals along at least two counter-propagating optical channels that traverse the detection zone in opposite directions along said length of the detection zone, the disturbance producing a phase variation in polarization components originating at the place of the disturbance;

separating at least one beam from the light source into at least two beams, and coupling the two beams into counter-propagating optical channels of the at least one optical waveguide so as to traverse the detection zone;

selectively combining polarization components of said at least two beams traveling along the optical waveguide, using a polarization sensitive beam combining technique upon at least one of said two counter-propagating optical channels, in a direction that is one of toward the detection zone and away from the detection zone;

detecting a polarization attribute of said at least two beams after traversing the detection zone, said polarization attribute being affected by the disturbance; and, determining from a timing relationship of the polarization attribute between said at least two beams, a place in the detection zone corresponding to the disturbance as a point along said length, spaced between said ends according to said timing relationship.

43. The method of claim 42, further comprising tuning said light source for one of adjusting and selecting a wavelength thereof.

44. The method of claim 42, comprising coupling light from the same said light source to provide the beams for both of said channels.

45. The method of claim 42, comprising coupling light from at least two light sources to provide the beams for said at least two channels.

46. The method of claim 42, comprising using a coherent laser as the light source.

47. The method of claim 42, comprising forming the optical waveguide using at least one optical fiber traversing the detection zone, and passing the counter-propagating beams through said at least one optical fiber in the detection zone.

48. The method of claim 42, comprising forming the optical waveguide using at least two optical fibers that are coextensive at least in the detection zone, and subjecting both of said at least two optical fibers to the disturbance in the detection zone.

49. The method of claim 42, comprising combining orthogonal polarization components for said at least two beams for at least one of said counter-propagating optical channels.

50. The method of claim 42, comprising resolving at least one polarization attribute of each of said counter-propagating optical channels, by combining signals from the beams traversing the channels, and by localizing the disturbance as a place along said zone corresponding to a time relationship in said polarization attribute.

51. The method of claim 42, wherein determining the place in the detection zone includes calculating a polarization response for at least one of the counter-propagating channels and converting the polarization response into a phase response.

52. The method of claim 51, further comprising calculating from the phase response a corresponding locality of the disturbance at least within a tolerance.

53. The method of claim 42, wherein said separating comprises separating an incident light beam into two orthogonally polarized sub-beams.

54. The method of claim 42, wherein said combining comprises joining at least two polarization components of at least two said beams for at least one of said at least two counter-propagating optical channels.

55. The method of claim 54, wherein said at least two polarization components are orthogonal components.

56. The method of claim 42, further comprising altering a polarization characteristic of the waveguide between applying said light source and detecting said polarization attribute.

57. The method of claim 56, comprising altering the polarization characteristic between applying the light source and separating the at least one beam.

58. The method of claim 56, comprising altering the polarization characteristic between separating the beam and said selectively combining.

59. The method of claim 56, comprising altering the polarization characteristic between said selectively combining and said detecting.

60. The method of claim 56, comprising separating the beam as a function of polarization so as to affect a ratio of an intensity of light traveling in one of two opposite directions on a path including the detection zone.

61. The method of claim 56, comprising controlling the polarization characteristic so as to affect a polarization state of each of the counter-propagating optical channels, before combining said channels.

62. The method of claim 56, comprising controlling the polarization characteristic at least in one mode, so as to produce diverse polarization states.

63. The method of claim 42, further comprising arranging at least one said detection zone so as to follow at least one of a detection line, a perimeter around an area, a pattern encompassing the area using spaced lines, a pattern encompassing a border of a volume, a pattern in the volume using spaced lines, and a path passing irregularly through successive zones of interest.

64. The method of claim 42, further comprising substantially contemporaneously with disturbance detection employing the optical waveguide as a data transmission path.

65. The method of claim 64, comprising using distinct wavelengths for said disturbance detection and for carrying data.

66. The method of claim 65, comprising carrying said distinct wavelengths over a same channel as the counter-propagating optical channels.

67. The method of claim 42, further comprising remotely communication a report of information regarding the disturbance.

68. A method for detecting and localizing a disturbance, comprising:
applying at least one light source to an optical system having at least one optical waveguide, the optical waveguide having at least one detection zone defining a length, wherein the disturbance can occur at any place in the detection zone and the optical system is configured to carry signals along at least two counter-propagating optical channels that traverse the detection zone;
separating at least one beam from the light source into at least two beams, and coupling the two beams into counter-propagating optical channels of the at least one optical waveguide so as to traverse the detection zone;
selectively combining polarization components of said at least two beams traveling along the optical waveguide, using a polarization sensitive beam combining technique upon at least one of said two counter-propagating optical channels, in a direction that is one of toward the detection zone and away from the detection zone;
detecting a polarization attribute of said at least two beams after traversing the detection zone, said polarization attribute being affected by the disturbance, wherein said detecting comprises:
combining into an output beam components of said two signals traversing the optical channels, so as to produce a combined beam for each of said two signals;
repetitively sampling, from each of said combined beams, sets of intensity values at two different polarization states, such that at least part of an intensity of the combined beam is distributed between intensities at the two polarization states, and wherein sampled values of the intensities correspond to coordinate values in a closed loop pattern of which at least one of an origin, orientation, eccentricity and size of the closed loop pattern varies with the output state of polarization of the combined beam;
processing the sampled values of the intensities to alter at least one of the origin, orientation, eccentricity and size of the closed loop pattern so as to generate a projection of the closed loop pattern that approximates a circle; and,
determining a changing angle in the circle of the sets of intensity values of successive said sampled values, thereby producing a sampled relationship of changing phase versus time for each of said two signals traversing the optical channels; and,
determining from a timing relationship of the polarization attribute for said at least two beams, a place in the detection zone corresponding to the disturbance.

69. The method of claim 68, further comprising comparing the changing phase versus time signals of said two signals over at least a time window so as to determine a time lead or lag relationship of polarization aspects of said two signals, and wherein said place in the detection zone is determined as a function of said time lead or lag and a propagation speed of light in the detection zone.

70. The method of claim 69, wherein said comparing of the changing phase comprises cross correlating the changing phase versus time signals over repetitive time windows to identify an emerging phase difference caused by the disturbance, and determining the place of the disturbance repetitively for said time windows.

* * * * *